US008734909B2

(12) United States Patent
Iyer et al.

(10) Patent No.: US 8,734,909 B2
(45) Date of Patent: May 27, 2014

(54) METHODS AND APPARATUS FOR COATING SUBSTRATES

(75) Inventors: Subramanian Easwaran Iyer, Blountville, TN (US); Jeremy Richard Lizotte, Gray, TN (US); William Joseph Burgess, Jonesborough, TN (US); Wayne Scott Strasser, Kingsport, TN (US); James Wilson Mercer, Jr., Kingsport, TN (US); Tony Wayne Helton, Kingsport, TN (US); Gary Darrel Boone, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 244 days.

(21) Appl. No.: 12/721,080

(22) Filed: Mar. 10, 2010

(65) Prior Publication Data

US 2011/0223342 A1      Sep. 15, 2011

(51) Int. Cl.
| | | |
|---|---|---|
| B29C 47/02 | (2006.01) | |
| B05C 5/00 | (2006.01) | |
| B05D 7/06 | (2006.01) | |
| B29C 47/00 | (2006.01) | |
| B29C 47/08 | (2006.01) | |
| B05C 5/02 | (2006.01) | |

(52) U.S. Cl.
CPC .............. *B29C 47/026* (2013.01); *B29C 47/003* (2013.01); *B29C 47/025* (2013.01); *B29C 47/0818* (2013.01); *B29C 47/0828* (2013.01); *B29C 47/0085* (2013.01); *B05D 7/06* (2013.01); *B05C 5/0241* (2013.01); *B05C 5/0254* (2013.01)
USPC ........................... 427/434.2; 118/405; 118/50

(58) Field of Classification Search
USPC ...................................... 427/430.1
See application file for complete search history.

(56) References Cited

U.S. PATENT DOCUMENTS

| 2,991,273 A | 7/1961 | Hechelhammer et al. |
| 2,999,835 A | 9/1961 | Goldberg |

(Continued)

FOREIGN PATENT DOCUMENTS

| CA | 2133696 A1 | 5/1995 |
| DE | 9316759 U1 | 2/1994 |

(Continued)

OTHER PUBLICATIONS

December, Timothy S., et al.; "The Effects of TPO Composition on Adhesion and Proposed Chemical Mechanism"; Paint and Coatings Industry; Mar. 2008; www.pcimag.com; pp. 76-82.

(Continued)

*Primary Examiner* — David Turocy
(74) *Attorney, Agent, or Firm* — Louis N. Moreno

(57) ABSTRACT

Methods and apparatus for coating substrates. A die can be employed for extrusion coating an elongated substrate, where the die defines a coating cavity therein. The die can comprise a die block having a coating supply channel for supplying a coating material to the coating cavity. The die can further comprise a guide plug and a die plate removably coupled to the die block. The guide plug can comprise a substrate inlet having a non-circular lateral cross-section, and the die plate can comprise a substrate outlet also having a non-circular lateral cross-section. A coating system comprising such a die can operate to coat a substrate where the substrate can be pushed at least partially through the die and contacts the coating material therein.

55 Claims, 15 Drawing Sheets

(56) References Cited

U.S. PATENT DOCUMENTS

| | | | |
|---|---|---|---|
| 2,999,846 | A | 9/1961 | Schnell et al. |
| 3,028,365 | A | 4/1962 | Schnell et al. |
| 3,084,662 | A * | 4/1963 | Badger .......................... 118/50 |
| 3,148,172 | A | 9/1964 | Fox |
| 3,153,008 | A | 10/1964 | Fox |
| 3,169,121 | A | 2/1965 | Goldberg |
| 3,207,814 | A | 9/1965 | Goldberg |
| 3,271,367 | A | 9/1966 | Schnell et al. |
| 3,599,286 | A | 8/1971 | Karet |
| 3,694,538 | A | 9/1972 | Okamoto et al. |
| 3,772,405 | A | 11/1973 | Hamb |
| 3,853,462 | A | 12/1974 | Smith |
| 3,941,904 | A | 3/1976 | Hoh et al. |
| 4,000,219 | A | 12/1976 | Smejkal |
| 4,123,436 | A | 10/1978 | Holub et al. |
| 4,124,574 | A | 11/1978 | Preston et al. |
| 4,143,187 | A | 3/1979 | Pilgrim et al. |
| 4,156,069 | A | 5/1979 | Prevorsek et al. |
| 4,190,686 | A | 2/1980 | Muis |
| 4,197,038 | A | 4/1980 | Hipp et al. |
| 4,209,475 | A | 6/1980 | Herrington |
| 4,397,986 | A | 8/1983 | Hornbaker |
| 4,430,484 | A | 2/1984 | Quinn |
| 4,433,088 | A | 2/1984 | Haaf et al. |
| 4,452,933 | A | 6/1984 | McCready |
| 4,465,820 | A | 8/1984 | Miller et al. |
| 4,558,096 | A | 12/1985 | Boon et al. |
| 4,567,142 | A | 1/1986 | Lloyd |
| 4,613,653 | A | 9/1986 | Kitchens et al. |
| 4,740,556 | A | 4/1988 | Abolins et al. |
| 4,757,110 | A | 7/1988 | Sato |
| 4,760,114 | A | 7/1988 | Haaf et al. |
| 4,775,597 | A | 10/1988 | Birkmeyer et al. |
| 4,935,306 | A | 6/1990 | Ohtsuka et al. |
| 4,981,898 | A | 1/1991 | Bassett |
| 4,982,014 | A | 1/1991 | Freitag et al. |
| 4,987,702 | A | 1/1991 | Anschutz |
| 5,010,162 | A | 4/1991 | Serini et al. |
| 5,084,511 | A | 1/1992 | Abe et al. |
| 5,162,058 | A | 11/1992 | Uenaka et al. |
| 5,166,237 | A | 11/1992 | Abe et al. |
| 5,286,547 | A | 2/1994 | Tyerman |
| 5,288,559 | A | 2/1994 | Oka et al. |
| 5,312,863 | A | 5/1994 | Van Rheenen et al. |
| 5,382,401 | A | 1/1995 | Pickett et al. |
| 5,415,943 | A | 5/1995 | Groger et al. |
| 5,484,632 | A | 1/1996 | Mercer, Jr. et al. |
| 5,654,347 | A | 8/1997 | Khemani et al. |
| 5,674,928 | A | 10/1997 | Chisholm et al. |
| 5,696,176 | A | 12/1997 | Khemani et al. |
| 5,725,944 | A | 3/1998 | Jones et al. |
| 5,824,373 | A | 10/1998 | Biller et al. |
| 5,898,043 | A | 4/1999 | Uemae et al. |
| 5,907,006 | A | 5/1999 | Rennie et al. |
| 5,914,083 | A | 6/1999 | Yada et al. |
| 5,925,698 | A | 7/1999 | Steckel |
| 5,962,573 | A | 10/1999 | Berta |
| 5,972,471 | A | 10/1999 | Jasenof et al. |
| 5,976,676 | A | 11/1999 | Miki et al. |
| 5,985,397 | A | 11/1999 | Witt et al. |
| 5,997,456 | A | 12/1999 | Butters et al. |
| 6,020,414 | A | 2/2000 | Nelsen et al. |
| 6,074,727 | A | 6/2000 | Miller et al. |
| 6,083,601 | A | 7/2000 | Prince et al. |
| 6,093,773 | A | 7/2000 | Evans et al. |
| 6,114,021 | A | 9/2000 | Pankratz |
| 6,153,264 | A | 11/2000 | Schmid et al. |
| 6,203,915 | B1 | 3/2001 | Prissok et al. |
| 6,206,965 | B1 * | 3/2001 | Rao et al. .................... 118/410 |
| 6,306,507 | B1 | 10/2001 | Brunelle et al. |
| 6,352,784 | B1 | 3/2002 | Katagiri |
| 6,353,050 | B1 | 3/2002 | Bastiaens et al. |
| 6,391,461 | B1 | 5/2002 | Ryntz et al. |
| 6,394,784 | B1 | 5/2002 | Gellert et al. |
| 6,448,328 | B1 | 9/2002 | Kappler et al. |
| 6,455,161 | B1 | 9/2002 | Regnier et al. |
| 6,461,792 | B1 | 10/2002 | Kawamura et al. |
| 6,500,895 | B1 | 12/2002 | Bastiaens et al. |
| 6,540,624 | B1 | 4/2003 | Isogawa |
| 6,576,309 | B2 | 6/2003 | Dalgewicz, III et al. |
| 6,579,611 | B1 | 6/2003 | Iwashita et al. |
| 6,583,189 | B1 | 6/2003 | King |
| 6,584,743 | B2 | 7/2003 | Paxton et al. |
| 6,596,784 | B1 | 7/2003 | King |
| 6,601,357 | B2 | 8/2003 | Tunis |
| 6,616,998 | B2 | 9/2003 | Greer et al. |
| 6,660,086 | B1 * | 12/2003 | Prince et al. .................. 118/125 |
| 6,667,367 | B1 | 12/2003 | Berta |
| 6,680,104 | B2 | 1/2004 | Boris et al. |
| 6,716,522 | B2 | 4/2004 | Matsumoto et al. |
| 6,852,765 | B2 | 2/2005 | Decker et al. |
| 6,933,043 | B1 | 8/2005 | Son et al. |
| 6,994,752 | B2 * | 2/2006 | Estrada et al. ................ 118/125 |
| 7,022,768 | B1 | 4/2006 | Lacroix et al. |
| 7,081,488 | B2 | 7/2006 | Bardman et al. |
| 7,097,879 | B2 | 8/2006 | Bolton et al. |
| 7,160,977 | B2 | 1/2007 | Hale et al. |
| 7,175,905 | B2 | 2/2007 | Curtis et al. |
| 7,226,985 | B2 | 6/2007 | Hale et al. |
| 7,318,958 | B2 | 1/2008 | Wang |
| 7,335,399 | B2 | 2/2008 | Bolton et al. |
| 7,368,511 | B2 | 5/2008 | Hale et al. |
| 7,374,795 | B2 | 5/2008 | Prince et al. |
| 7,435,483 | B2 | 10/2008 | Lee et al. |
| 7,694,468 | B2 | 4/2010 | Prince et al. |
| 8,071,198 | B2 | 12/2011 | Michalczyk et al. |
| 8,071,695 | B2 | 12/2011 | Strand et al. |
| 8,113,143 | B2 | 2/2012 | Prince et al. |
| 8,197,733 | B2 | 6/2012 | Sudano |
| 8,394,784 | B2 | 3/2013 | Stroumpoulis et al. |
| 2004/0131871 | A1 | 7/2004 | Lee et al. |
| 2005/0050814 | A1 | 3/2005 | Prince et al. |
| 2005/0102963 | A1 | 5/2005 | Nien et al. |
| 2005/0137356 | A1 | 6/2005 | Hale et al. |
| 2006/0022376 | A1 | 2/2006 | Prince et al. |
| 2006/0111519 | A1 | 5/2006 | Strand et al. |
| 2006/0270806 | A1 | 11/2006 | Hale |
| 2007/0000568 | A1 | 1/2007 | Bohme et al. |
| 2007/0292569 | A1 | 12/2007 | Bohme et al. |
| 2008/0145564 | A1 | 6/2008 | Allam et al. |
| 2008/0314312 | A1 * | 12/2008 | Prince et al. .................... 118/75 |
| 2009/0035581 | A1 | 2/2009 | Sudano |
| 2010/0003410 | A1 * | 1/2010 | King et al. .................... 427/294 |
| 2010/0021677 | A1 | 1/2010 | West et al. |
| 2011/0223342 | A1 | 9/2011 | Iyer et al. |

FOREIGN PATENT DOCUMENTS

| | | |
|---|---|---|
| DE | 44 24 767 C1 | 11/1995 |
| DE | 198 57 045 A1 | 6/2000 |
| EP | 0 132 218 A2 | 1/1985 |
| EP | 0 210 297 A1 | 2/1987 |
| EP | 0 488 711 A2 | 6/1992 |
| EP | 0 510 463 A1 | 10/1992 |
| EP | 0 653 469 A2 | 5/1995 |
| FR | 2 861 738 A1 | 5/2005 |
| GB | 2 024 658 A | 1/1980 |
| JP | S59 155024 A | 9/1984 |
| JP | 1-225647 A | 9/1989 |
| JP | 3-26752 A | 2/1991 |
| JP | 1996034866 A | 2/1996 |
| JP | 08-300590 A | 11/1996 |
| JP | 9324135 A | 12/1997 |
| JP | 11090827 A | 4/1999 |
| JP | 1999245590 A | 9/1999 |
| JP | 2002-337291 A | 11/2002 |
| JP | 2003-056168 A | 2/2003 |
| JP | 2004-211039 A | 7/2004 |
| JP | 2005-264136 A | 9/2005 |
| WO | WO 96/18685 A1 | 6/1996 |
| WO | WO 97/46627 A1 | 12/1997 |
| WO | WO 98/27159 A1 | 6/1998 |

(56) References Cited

FOREIGN PATENT DOCUMENTS

| WO | WO 01/27200 A3 | 4/2001 |
|---|---|---|
| WO | WO 2006/093916 A2 | 9/2006 |
| WO | WO 2008/040498 A1 | 4/2008 |

OTHER PUBLICATIONS

Berta, Dominic A.; "Formulating Plastics for Paint Adhesion"; Chapter 3 from Coatings of Polymers and Plastics, 2003, edited by Ryntz, Rose,A. and Yaneff, Phillip V.; pp. 85-119.
ASTM Test Method D 2457.
ASTM D 3359-02.
ASTM D 523.
ASTM E 1164.
ASTM E 308.
"Blendex BMAT Data Sheet Styrene Acrylonitrile", http://www.ides.com/info/datasheet/E73798/BLENDEX-BMAT, Sep. 13, 2012.
"PARALOID™ KM-377 Acrylic Impact Modifier", Technical Data Sheet, The Dow Chemical Company.
Notification of Transmittal of the International Search Report and the Written Opinion of the International Searching Authority dated Jan. 22, 2010 for International Application No. PCT/US2009/004107.
Notification of Transmittal of the International Search Report and the Written Opinion of the International Searching Authority dated Apr. 28, 2011 for International Application No. PCT/US2011/026942.
ASTM D3330.
"Blendex BMAT Modifier Resin"; Chemtura; www.chemtura.com; Effective Jun. 4, 2008; (2007).
"Butyl acrylate-methyl methacrylate polymers"; Chemical Book; www.chemicalbook.com; (2008).
"PARALOID KM-377 Impact Modifier"; Material Safety Data Sheet, DOW; Revision Date: Feb. 7, 2004.
Turner, S. R., et al.; "Polyesters Based on 1,4-Cyclohexanedimethanol"; Modern Polyesters: Chemistry and Technology of Polyesters and Copolyesters; (2003); pp. 280-282.
"Chlorocarbons and Chlorohydrocarbons—$C_2$ To Combustion Technology"; Encyclopedia of Chemical Technology; $4^{th}$ Edition, vol. 6, (1993), pp. 620-623.
Strasser, CFD Investigation of Gear Pump Mixing Using Deforming/Agglomerating Mesh, J. Fluids Eng.—Apr. 2007—vol. 129, Issue 4, 476 (9 pages).
Copending U.S. Appl. No. 12/503,675, filed Jul. 15, 2009, Jeremy Richard Lizotte et al.
USPTO Office Action dated Apr. 2, 2012 for copending U.S. Appl. No. 12/503,675.
Copending U.S. Appl. No. 13/616,672, filed Sep. 14, 2012, Jeremy Richard Lizotte et al.
Copending U.S. Appl. No. 13/616,681, filed Sep. 14, 2012, Jeremy Richard Lizotte et al.
USPTO Office Action dated Dec. 6, 2012 for copending U.S. Appl. No. 12/503,675.
Copending U.S. Appl. No. 13/706,408, filed Dec. 6, 2012, Tony Wayne Helton.
USPTO Office Action dated Feb. 26, 2013 for copending U.S. Appl. No. 13/616,672.
USPTO Office Action dated Feb. 27, 2013 for copending U.S. Appl. No. 13/616,681.
Copending U.S. Appl. No. 13/861,412, filed Apr. 12, 2013, Gordon L. King.
Notification of Transmittal of the International Search Report and The Written Opinion of the International Searching Authority, or the Declaration—International Application No. PCT/US2013/072546 with a mailing date of Mar. 11, 2014.
USPTO Office Action dated Jul. 16, 2013 in copending U.S. Appl. No. 13/706,408.
Notification of Transmittal of the International Search Report and the Written Opinion of the International Searching Authority dated Jul. 18, 2013 for International Application No. PCT/US2013/037957.
USPTO Office Action dated Sep. 13, 2013 in copending U.S. Appl. No. 13/616,681.
Billmeyer, Fred W., Jr.; "Textbook of Polymer Science", $3^{rd}$ Edition, John Wiley & Sons, Inc., New York, p. 153 (1984).
Carraher, Charles E., Jr.; "Introduction to Polymer Chemistry", $3^{rd}$ Edition, CRC Press Taylor & France Group, Boca Raton, FL, p. 240 (2013).
USPTO Office Action dated Jan. 6, 2014 in copending U.S. Appl. No. 12/503,675.

\* cited by examiner

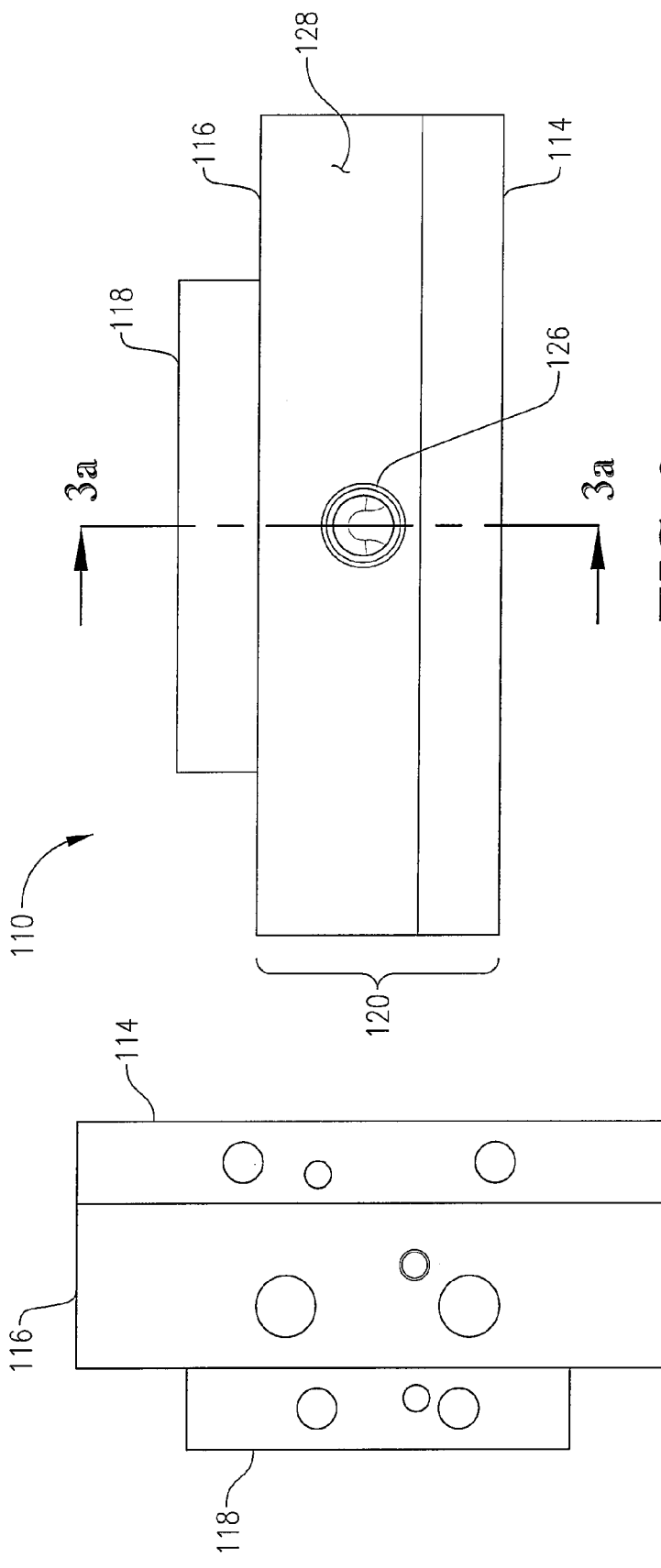

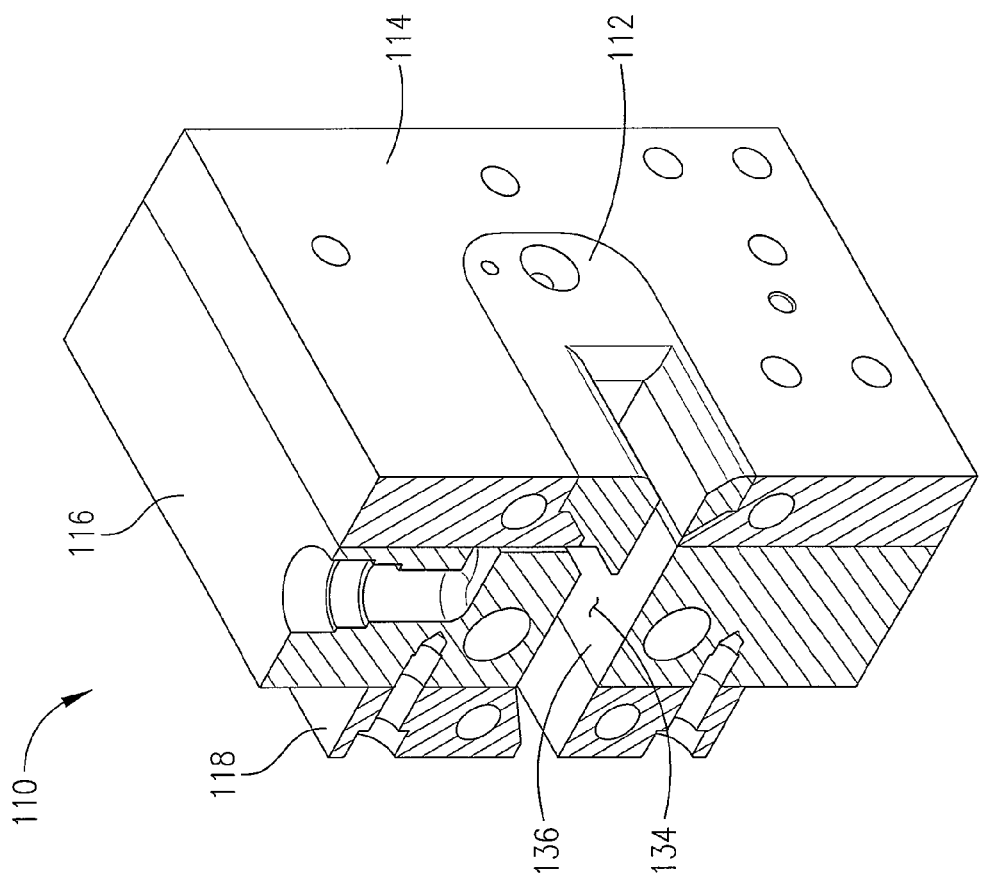
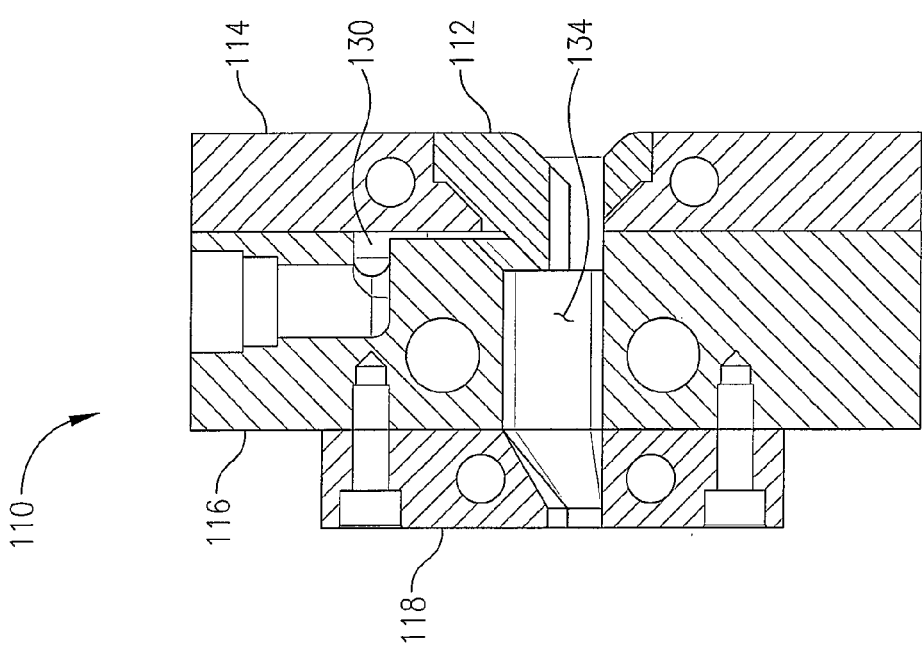

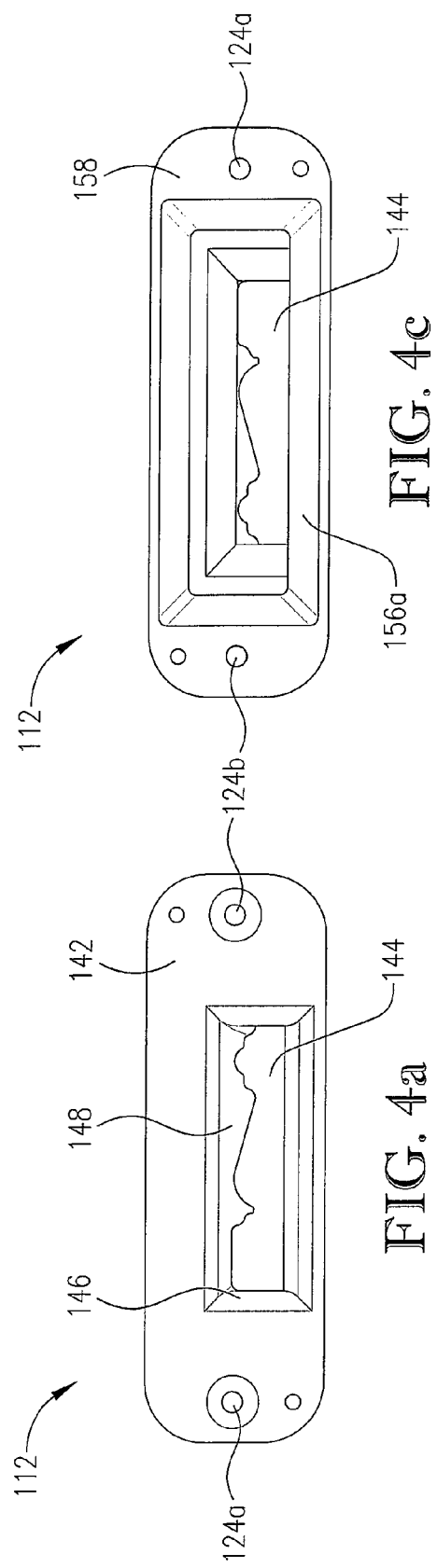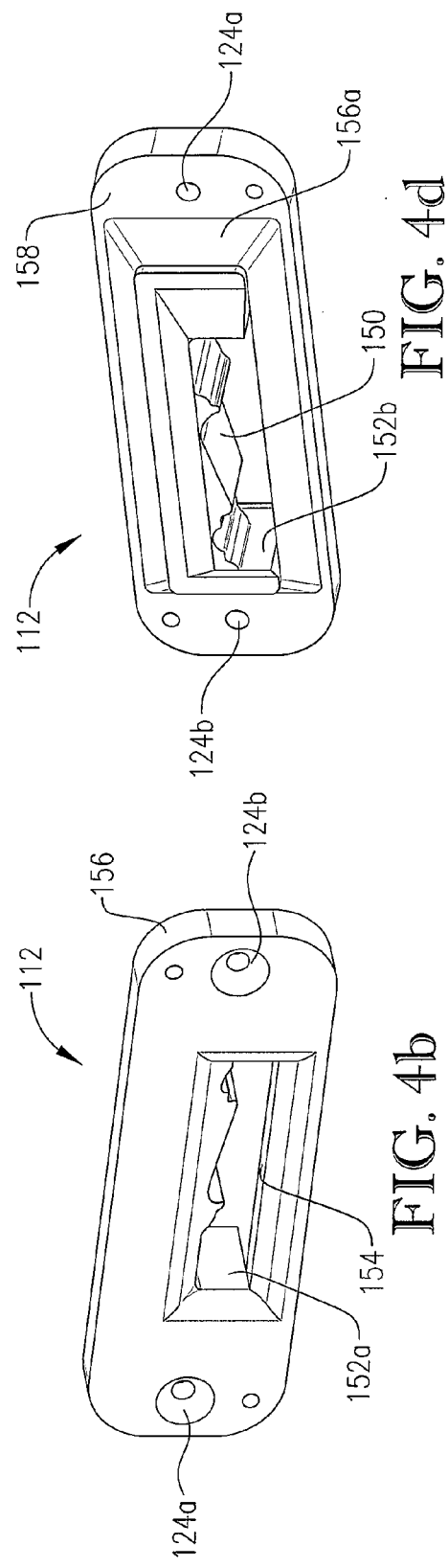

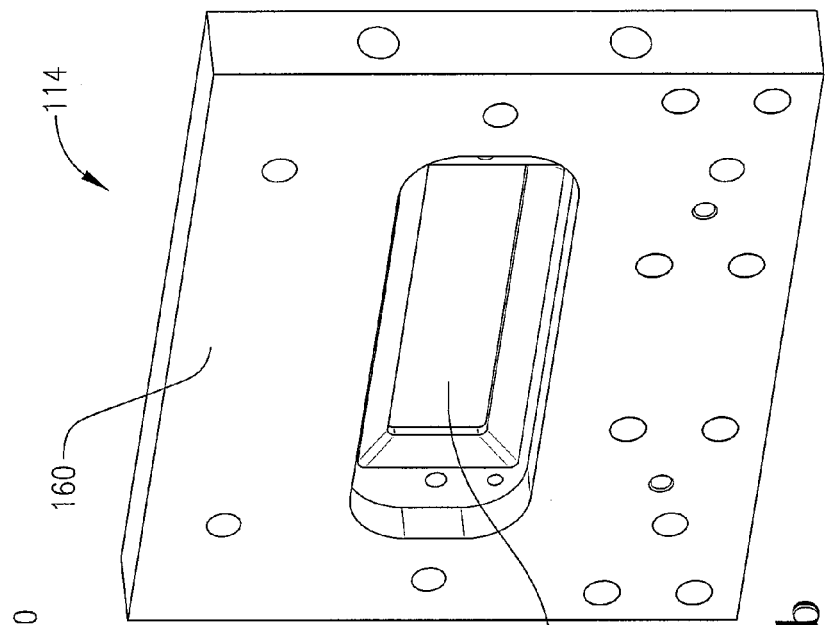
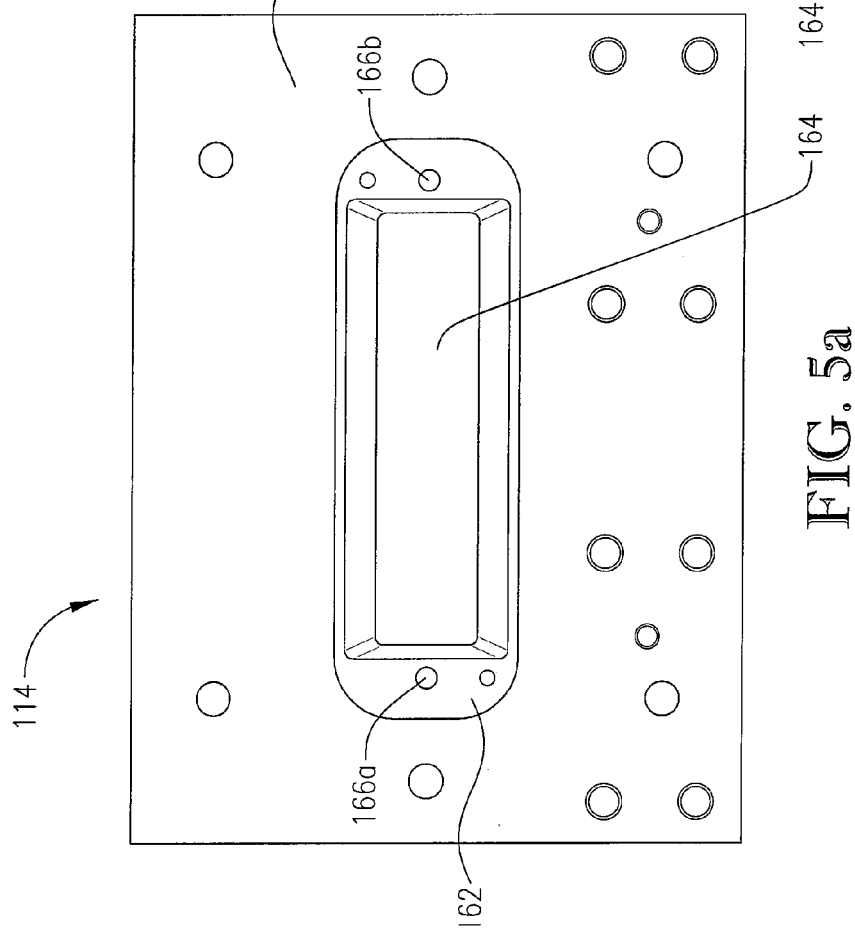
FIG. 5a
FIG. 5b

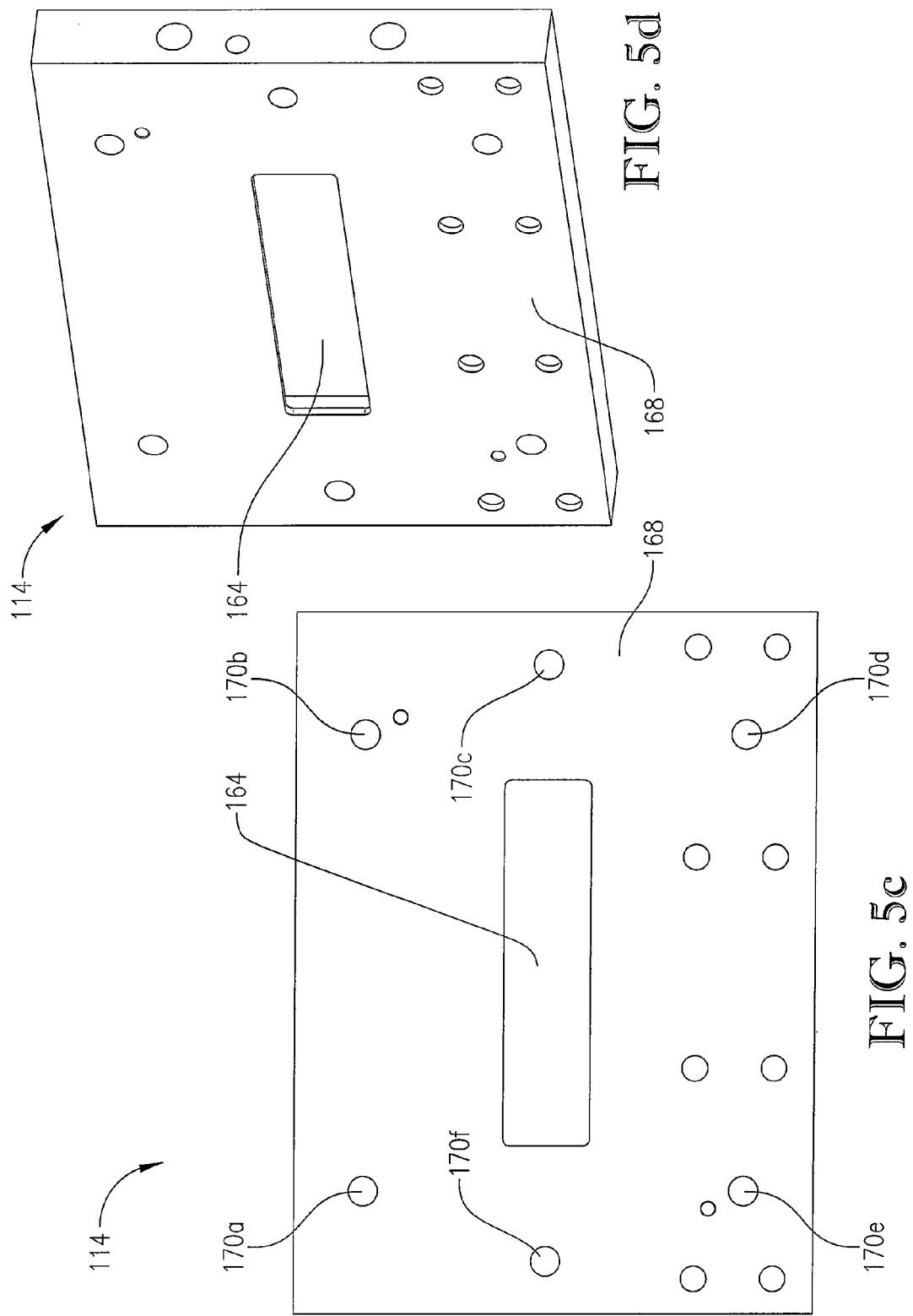

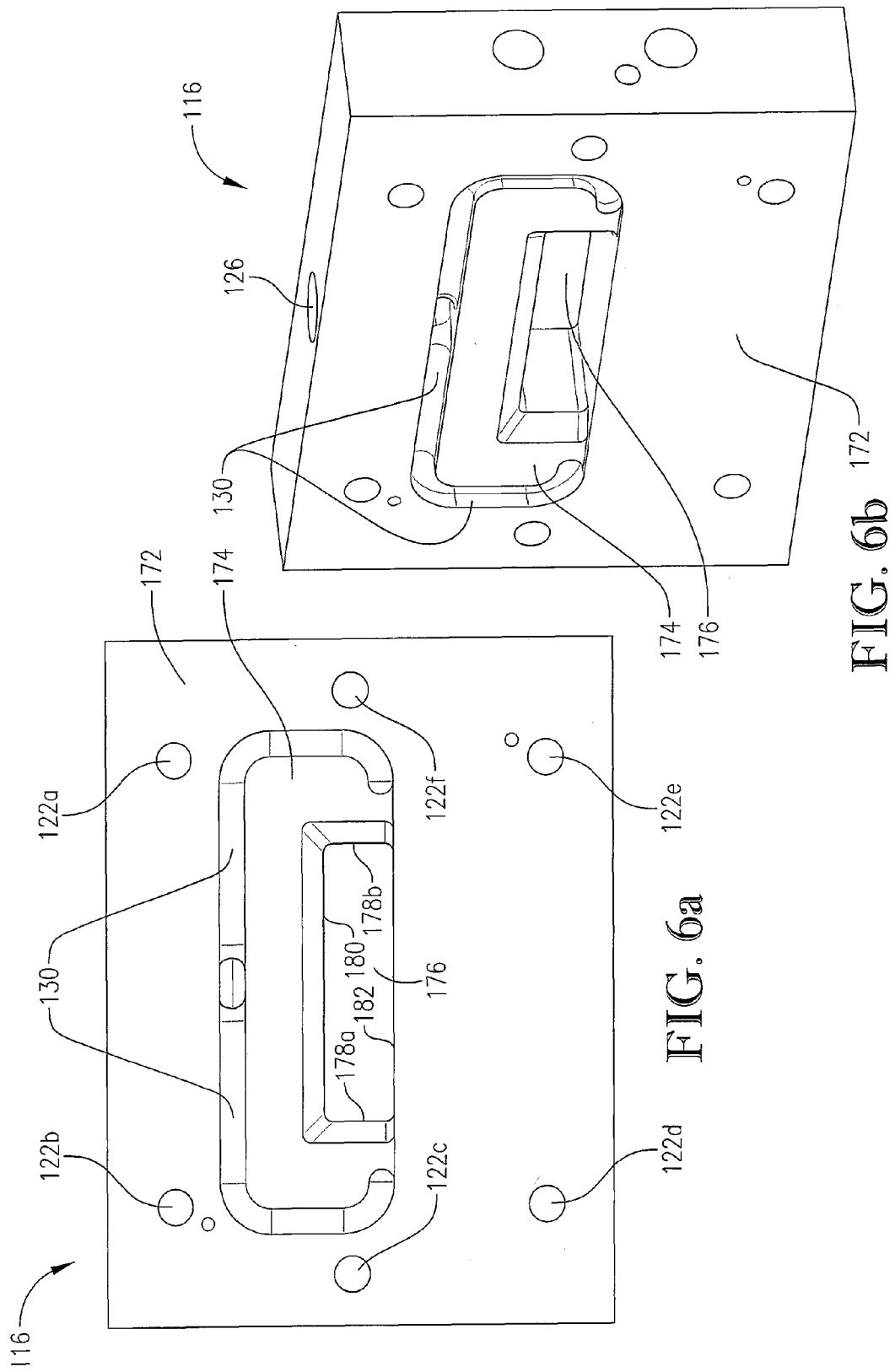

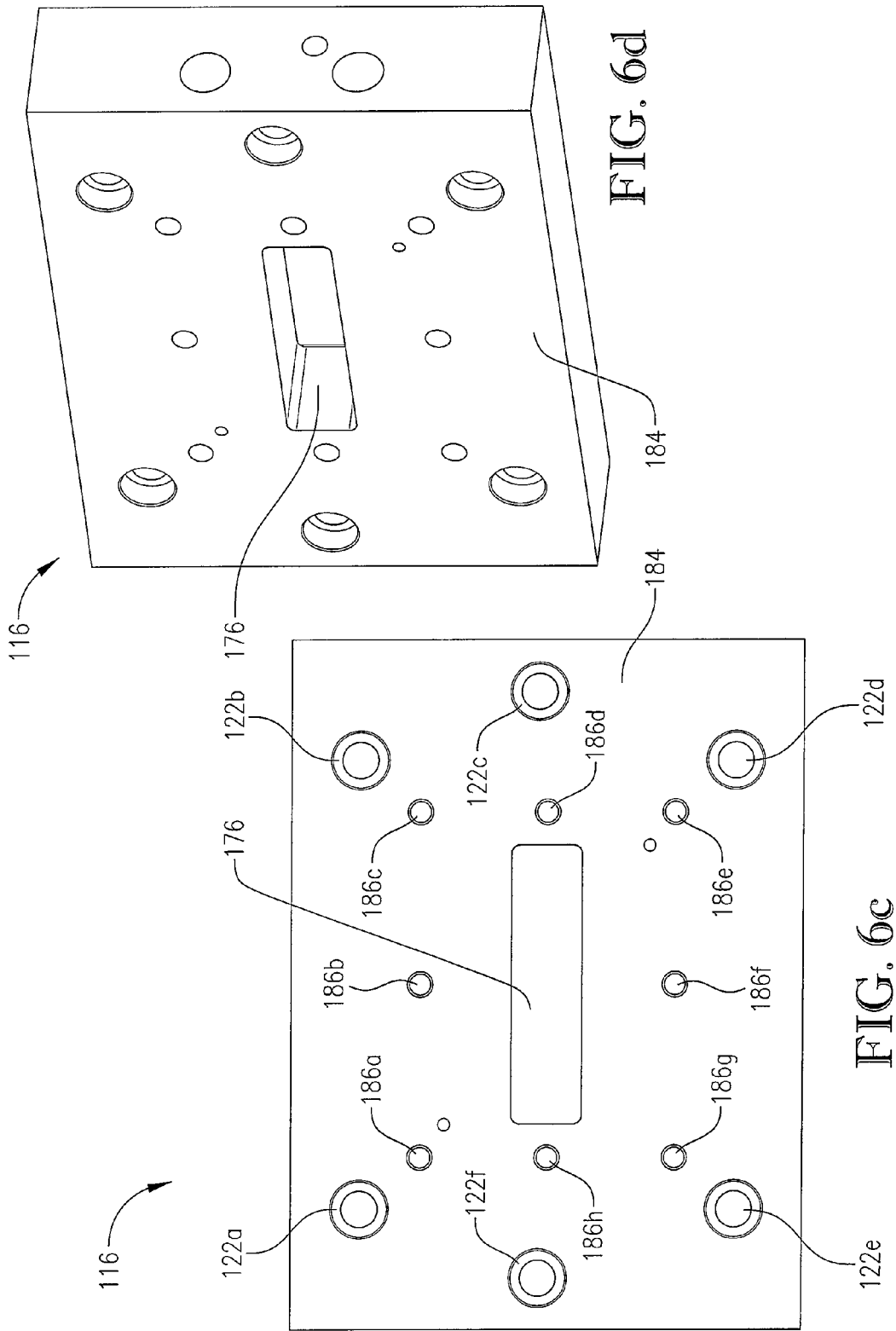

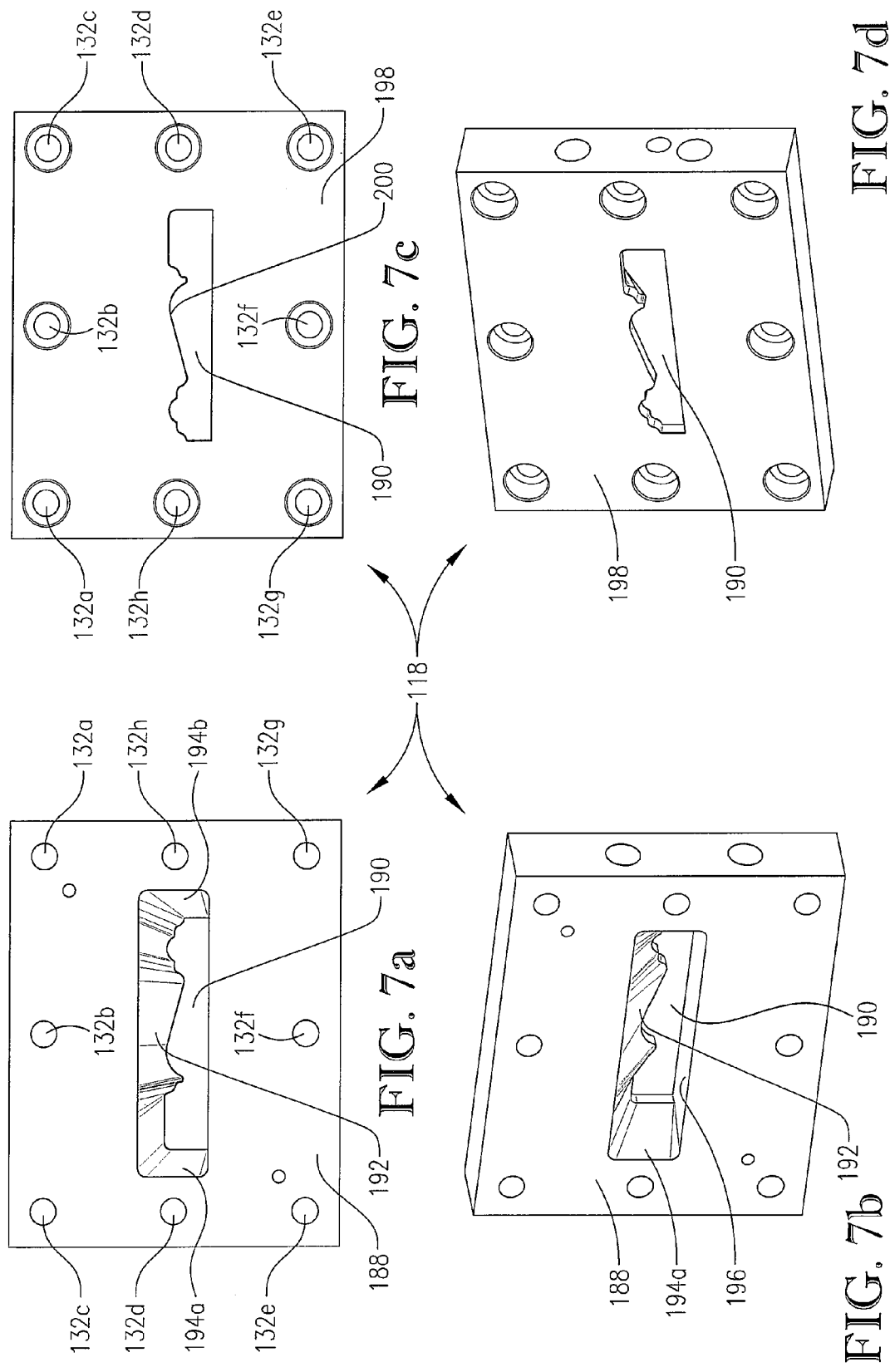

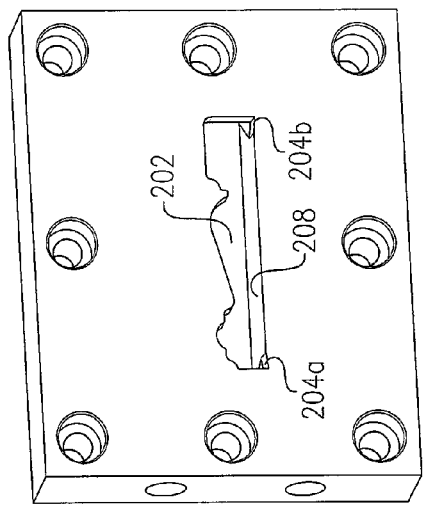
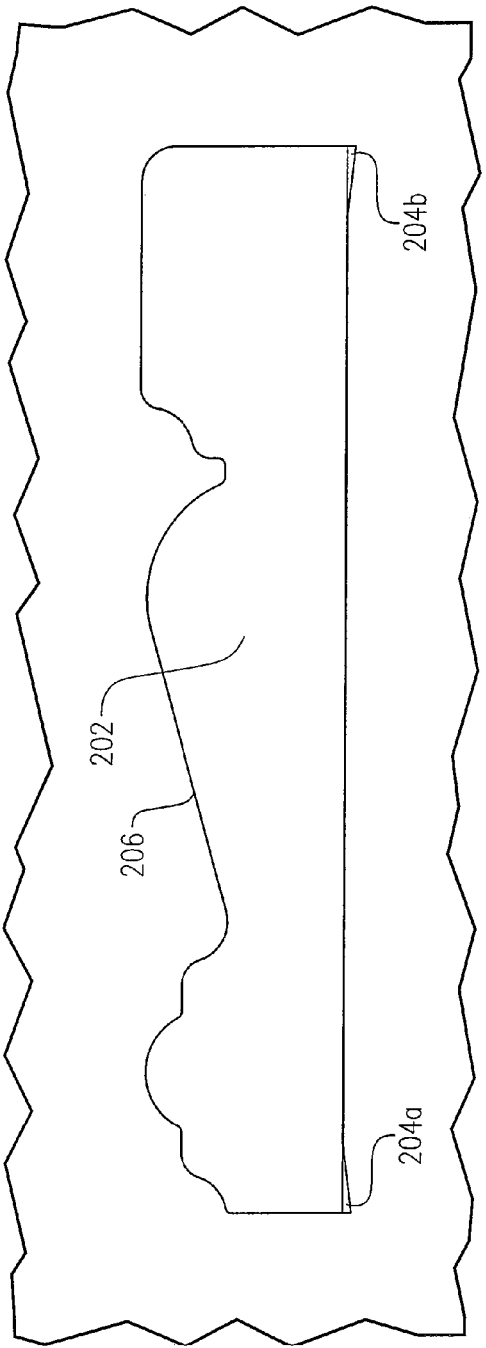
FIG. 8a
FIG. 8b
FIG. 8c

METHODS AND APPARATUS FOR COATING SUBSTRATES

BACKGROUND

1. Field of the Invention

One or more embodiments of the invention generally relate to methods and apparatus for coating substrates.

2. Description of the Related Art

Various methods for applying coatings to a substrate are known in the art. In applying a coating substance to substrates such as plastic, metal, or wood, the coating substance is typically a paint that is applied with a solvent as a carrying agent. This allows the paint to coat the substrate surface quickly and efficiently. One draw back to such paints, however, is that the solvent must evaporate out of the paint and the paint must dry before the surface can be handled.

Another method for applying a coating to a substrate includes applying an electrostatic charge to the surface of the substrate, typically a metal, and then oppositely charging a paint so that, as it is blown against the surface of the substrate, the opposite charges attract the paint to the surface. Once the paint powder attaches to the surface via electrostatic charge, the substrate is heated in an oven to cure the paint for the final finish. This method additionally requires the steps of cleaning the substrate surface in order for the paint to adhere to all portions of the surface, heating the substrate to a sufficient temperature to melt the paint for application, and finally cooling the substrate for handling.

Still another method for coating a substrate includes running the substrate via a conveyor through a ribbon of coating material to coat the exposed surfaces. The substrate is then inverted to coat the bottom surface as it passes through the curtain of coating material again or in a second stage. In this method, the coating material is a liquid, which typically requires the use of solvents to aid in the deposition of the coating material and the flow of the coating material during the coating step. Moreover, the coating material goes on wet and must dry prior to handling of the substrate or prior to application of any additional coatings that may be desired.

An alternative method can apply a coating known as Gesso to a substrate. This coating is a thick paste that goes on in a sort of "wipe on" and then "wipe off" type process and requires drying after coating. Often, a second coating is used to achieve the desired surface look. Gesso coating is brittle but yields a smooth, attractive finished surface that can hide many imperfections in the underlying substrate.

Another method makes use of a vacuum coating or spray coating technique that simply uses a high volume of water-based latex paint to prime the surface. This process also requires a drying step along with sanding/buffing followed by another paint priming and drying step. Unlike Gesso, the vacuum and spray coating technology leads to direct telegraphing of the underlying substrate surface to the observable paint surface. Thus, the smoothness of the vacuum or spray coating is wholly dependent on the substrate milling operation and capabilities.

Solvent-based carriers and coating materials incur the added expense of the solvent required to carry the coating material. The drying stages typically require extra time, thus lowering through-put for assembly line finish work. Dry coating and heating of items to cure the paint coating also add to the finish time required, which further reduces throughput. Accordingly, improvements in methods and apparatus for coating substrates may be desired.

SUMMARY

One embodiment of the present invention concerns a die for extrusion coating an elongated substrate. The die of this embodiment comprises: (a) a die block defining at least a portion of a coating cavity, where the die block further defines a coating supply channel for supplying a coating material to the coating cavity; (b) a guide plug removably coupled to the die block and defining a substrate inlet for receiving the substrate and directing the substrate towards the coating cavity; and (c) a die plate removably coupled to the die block and defining a substrate outlet for discharging the substrate from the die, where the substrate outlet has a non-circular lateral cross-section substantially corresponding in shape to the lateral cross-section of the substrate inlet.

Another embodiment of the present invention concerns a system for applying a coating material to multiple sides of an elongated substantially rigid substrate. The system of this embodiment comprises: (a) a die for contacting the substrate with the coating material, where the die defines a coating cavity, a coating supply channel, a substrate inlet, and a substrate outlet; and (b) a substrate feeder for aligning the substrate with the substrate inlet and pushing the substrate at least partly through the die via the substrate inlet, coating cavity, and substrate outlet. Furthermore, in this embodiment, the die comprises a die block, a guide plug removably coupled to the die block, and a die plate removably coupled to the die block, where the guide plug defines the substrate inlet and the die plate defines the substrate outlet.

Yet another embodiment of the present invention concerns a method of coating a substrate. The method of this embodiment comprises: (a) introducing a coating material into a coating cavity of a die; (b) pushing an elongated substrate into the die through a substrate inlet; (c) passing the elongated substrate through the coating cavity so as to contact the elongated substrate with the coating material; and (d) discharging the substrate from the die through a substrate outlet thereby forming a coated substrate. In this embodiment, the die comprises a die block, a guide plug, and a die plate, where the guide plug and the die plate are removably coupled to the die block, where the guide plug defines the substrate inlet, and where the die plate defines the substrate outlet.

BRIEF DESCRIPTION OF THE FIGURES

Embodiments of the present invention are described herein with reference to the following drawing figures, wherein:

FIG. 2b is a side view of the assembled die depicted in FIG. 2a, particularly illustrating the back plate, the die body, and the die plate;

FIG. 2c is a top view of the assembled die depicted in FIG. 2a, particularly illustrating a coating material inlet located on the upper surface of the die body;

FIG. 3a is a cross-sectional view of the die depicted in FIG. 2c with the cross-section taken along line 3a-3a, particularly illustrating a coating cavity defined by the guide plug, back plate, die body, and die plate;

FIG. 3b is a top/rear isometric view of the cross-sectional die depicted in FIG. 3a;

FIG. 4a is a rear view of the guide plug of the die depicted in FIGS. 2a-e;

FIG. 4b is a top/rear isometric view of the guide plug depicted in FIG. 4a;

FIG. 4c is a front view of the guide plug depicted in FIG. 4a;

FIG. 4d is a bottom/front isometric view of the guide plug depicted in FIG. 4a;

FIG. 5a is a rear view of the back plate of the die depicted in FIGS. 2a-e;

FIG. 5b is a top/rear isometric view of the back plate depicted in FIG. 5a;

FIG. 5c is a front view of the back plate depicted in FIG. 5a;

FIG. 5d is a bottom/front isometric view of the back plate depicted in FIG. 5a;

FIG. 6a is a rear view of the die body of the die depicted in FIGS. 2a-e;

FIG. 6b is a top/rear isometric view of the die body depicted in FIG. 6a;

FIG. 6c is a front view of the die body depicted in FIG. 6a;

FIG. 6d is a bottom/front isometric view of the die body depicted in FIG. 6a;

FIG. 7a is a rear view of the die plate of the die depicted in FIGS. 2a-e;

FIG. 7b is a top/rear isometric view of the die plate depicted in FIG. 7a;

FIG. 7c is a front view of the die plate depicted in FIG. 7a;

FIG. 7d is a bottom/front isometric view of the die plate depicted in FIG. 7a;

FIG. 8a is a rear view of an alternate die plate, particularly illustrating a substrate outlet having feathering channels along the bottom corners of the substrate outlet;

FIG. 8b is a front view of an alternate die plate, particularly illustrating feathering channels along the bottom corners of the substrate outlet;

FIG. 8c is an enlarged view of the substrate outlet of the die plate depicted in FIG. 8b, particularly illustrating the feathering channels at the bottom corners of the substrate outlet.

DETAILED DESCRIPTION

Figure 1:
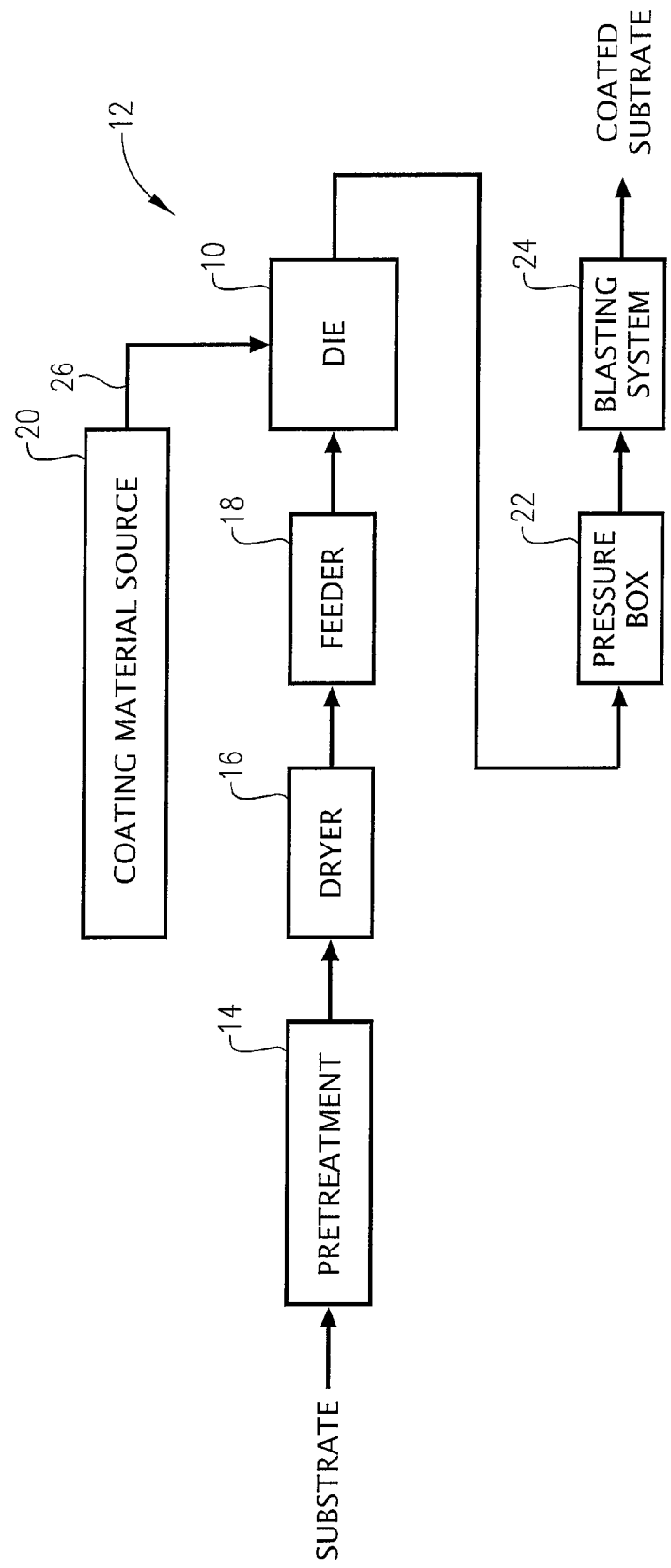
FIG. 1 is a process flow diagram according to one aspect of the present invention depicting a system for coating a substrate, such system comprising a pretreatment zone, a dryer, a feeder, a coating material source, a die, a pressure box, and a blasting system.

Referring initially to FIG. 1, a die 10 is disposed in a coating system 12 for applying a coating material to a substrate. The coating system 12 is depicted as including the die 10, a pretreatment zone 14, a dryer 16, a feeder 18, a coating material source 20, a pressure box 22, and a blasting system 24. The coating system 12 can be configured to initially introduce a substrate into the pretreatment zone 14. Thereafter, the substrate can be dried in the dryer 16 and passed to the feeder 18. The feeder 18 can operate to feed the substrate into the die 10. The die 10 can be coupled in fluid flow communication with the coating material source 20 and configured to receive a coating material via a line 26. Additionally, the die 10 can be configured to facilitate contact between the incoming substrate and the coating material. After passing through the die 10, the substrate can then be sequentially introduced into the pressure box 22 and the blasting system 24. The resulting coated substrate can then be subjected to other various finishing processes or simply removed from the coating system 12.

Referring now to FIGS. 2a-e, a die 110 is depicted as comprising a guide plug 112, a back plate 114, a die body 116, and a die plate 118. The die 110 presents a configuration suitable for use as the die 10 in the coating system 12 depicted in FIG. 1. The various components that make up the die 110 can be formed from a durable material (e.g., metal) that can also be inert. For example, the die 110 components can be formed from steel or stainless steel.

Referring still to FIGS. 2a-e, the back plate 114 can be rigidly coupled to the die body 116 to form a die block 120. Any coupling methods known or hereafter discovered in the art can be employed for coupling the back plate 114 and the die body 116, such as, for example, bolting, clamping, or welding. In one or more embodiments, the back plate 114 and the die body 116 can be coupled via fasteners, such as screws or bolts, through the apertures 122a,b,c,d,e,f, which can be threaded apertures. In an alternate embodiment, the die block 120 can be formed from a single component (not depicted).

Figure 2A:
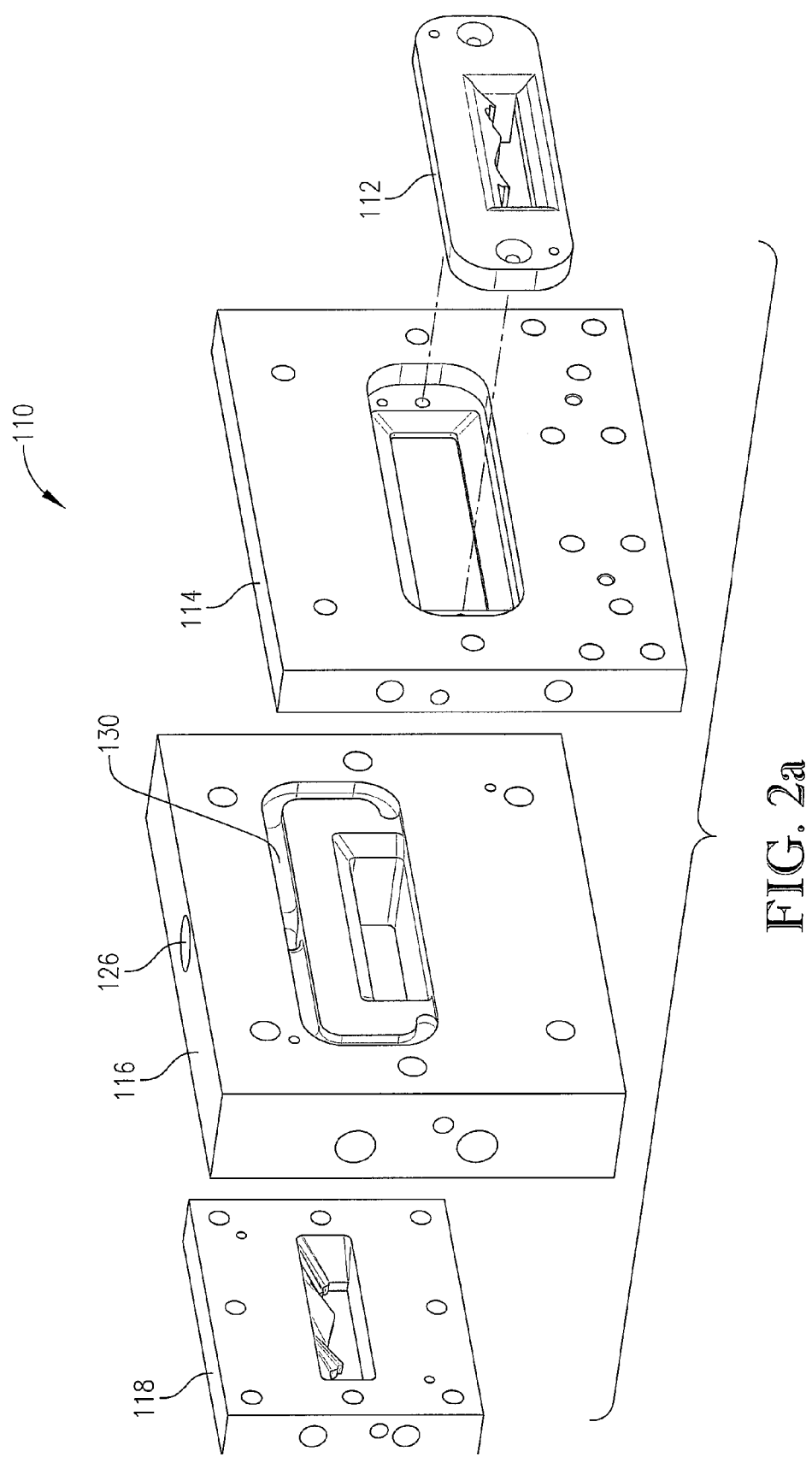
FIG. 2a is a top/rear isometric exploded view of a die according to one embodiment of the present invention, particularly illustrating a guide plug, a back plate, a die body, and a die plate.
Figure 2D:
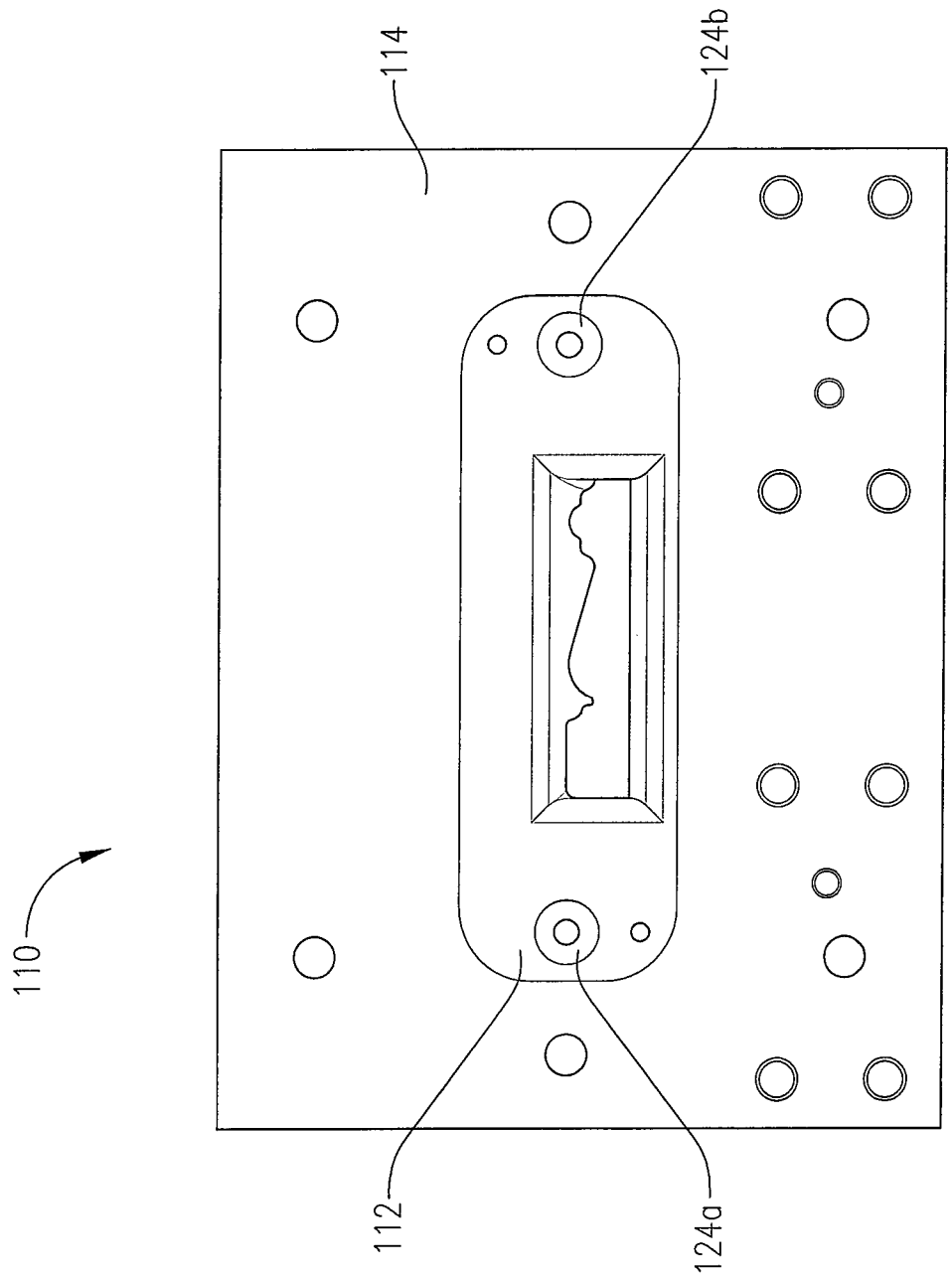
FIG. 2d is a rear view of the assembled die depicted in FIG. 2a, particularly illustrating the guide plug defining a substrate inlet, where the guide plug is removably coupled to the back plate.

In FIG. 2d, the guide plug 112 is depicted as coupled to the die block 120 via the back plate 114. The guide plug 112 can be coupled to the back plate 114 using any methods known or hereafter discovered in the art, such as, for example, by bolting or clamping. In one or more embodiments, the guide plug 112 can be coupled to the back plate 114 by fasteners, such as screws or bolts, through the apertures 124a,b, which can be threaded apertures. Regardless of the method employed for coupling the guide plug 112 to the back plate 114, in one or more embodiments the guide plug 112 can be removably coupled to the back plate 114. As used herein, the term "removably coupled" shall mean that the guide plug 112 (or, as discussed in greater detail below, the die plate) is capable of being removed from the die block 120 without uncoupling the die block 120 from a coating material source. For example, when the die 110 is employed as the die 10 in the coating system 12 of FIG. 1, the guide plug 112 can be removed from the die block 120 without disconnecting the die block 120 from the coating material source 20.

As perhaps best seen in FIG. 2c, the die block 120, and specifically the die body 116, defines a coating material inlet 126. Although FIG. 2c depicts the coating material inlet 126 as being located on the normally upper surface 128 of the die block 120, the position of the coating material inlet 126 is not critical and can be located at various other positions on the die block 120. The coating material inlet 126 is coupled in fluid flow communication with a coating material source. Additionally, the coating material inlet 126 can be threaded. For instance, when the die 110 is employed as the die 10 in the coating system 12 of FIG. 1, the coating material inlet 126 can be coupled in fluid flow communication with the coating material source 20. The coating material inlet 126 can have any configuration suitable for receiving a coating material (e.g., a molten extrusion coating material) from a coating material source.

As can be seen in FIG. 2a, the die body 116 further defines a coating supply channel 130 in fluid flow communication with the coating material inlet 126. The coating supply channel 130 can have any configuration suitable for directing a flow of coating material received from the coating material inlet 126 to a coating cavity defined within the die 110, such as the coating cavity discussed in greater detail below with reference to FIGS. 3a-c.

Figure 2E:
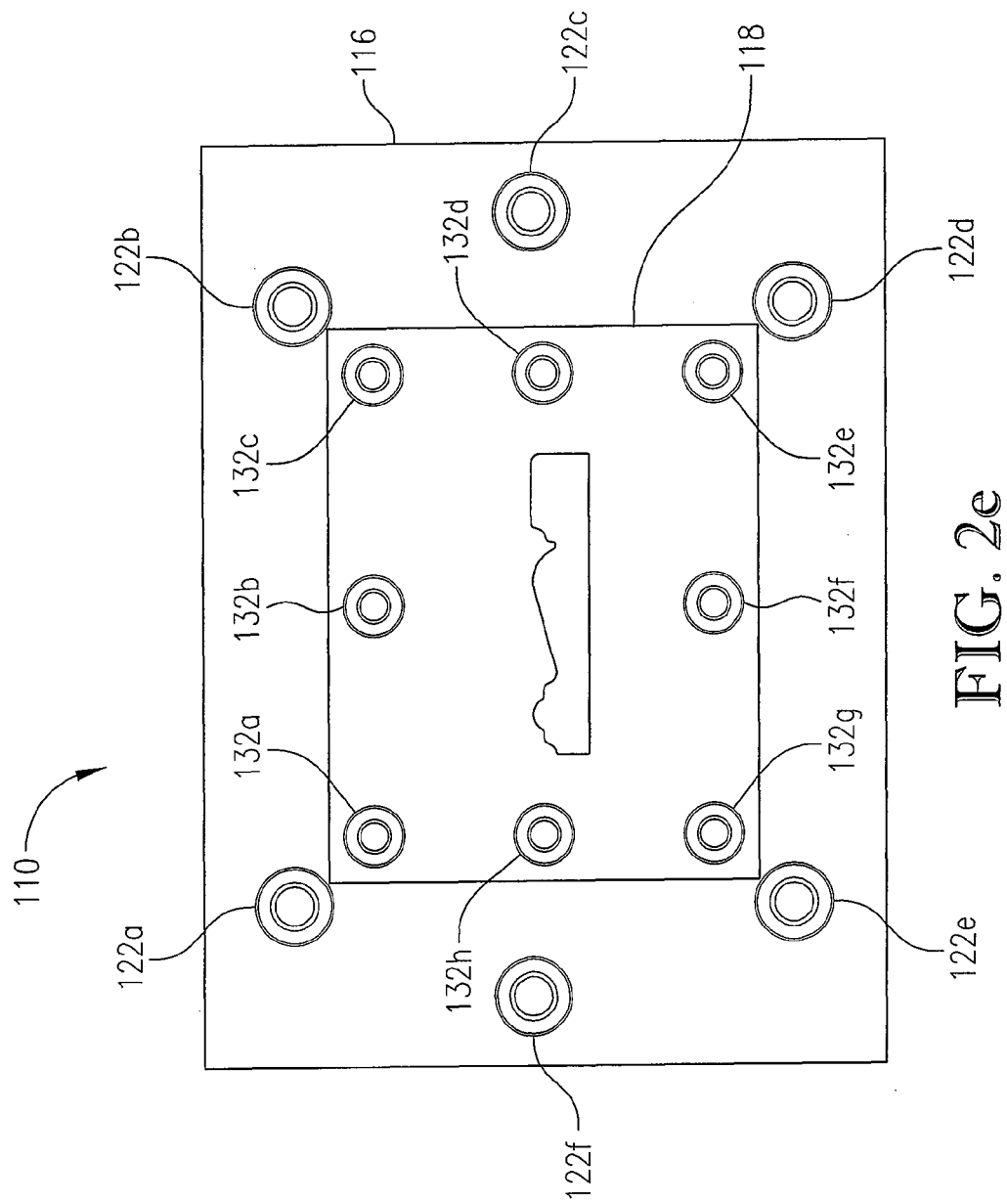
FIG. 2e is a front view of the assembled die depicted in FIG. 2a, particularly illustrating the die plate defining a substrate outlet, where the die plate is removably coupled to the die body.

In FIG. 2e, the die plate 118 is depicted as coupled to the die block 120 via die body 116. The die plate 118 can be coupled to the die body 116 using any methods known or hereafter discovered in the art, such as, for example, by bolting or clamping. In one or more embodiments, the die plate 118 can be coupled to the die body 116 by fasteners, such as screws or bolts, through the apertures 132a,b,c,d,e,f,g,h, which can be threaded apertures. Regardless of the method employed for coupling the die plate 118 to the die body 116, in one or more embodiments the die plate 118 can be removably coupled to the die body 116. As noted above, the term "removably coupled" shall mean that the die plate 118 (or the above-mentioned guide plug 112) is capable of being removed from the die block 120 without uncoupling the die block 120 from a coating material source. For example, when the die 110 is employed as the die 10 in the coating system 12 of FIG. 1, the die plate 118 can be removed from the die block 120 without disconnecting the die block 120 from the coating material source 20.

FIGS. 3a and 3b represent a vertical cross section of the die 110 taken along line 3a-3a in FIG. 2c. As can be seen in FIGS. 3a and 3b, the die 110 defines therein a coating cavity 134. The coating cavity 134 is in fluid flow communication with the coating supply channel 130. Additionally, the coating cavity 134 can facilitate contact between a coating material supplied via the coating supply channel 130 and a substrate passing through the die 110 via the coating cavity 134. The coating cavity 134 can have any volume or dimensions suitable for facilitating such contact.

As can be seen in FIGS. 3a and 3b, the coating cavity 134 can be defined by the various components of the die 110 in conjunction. A rear portion of the coating cavity 134 is defined by the guide plug 112 and the back plate 114. A mid portion of the coating cavity 134 is defined by the die body 116, and a front portion of the coating cavity 134 is defined by the die plate 118. It should be noted that the directional terms "front" and "forward," when referring to the die 110, designate the side or direction at which a substrate would normally exit the die 110 after being coated. Conversely, the directional terms "rear" and "back" refer to the side of the die 110 which a substrate is intended to enter. Thus, when in use, a substrate would generally pass through the die 110 from back to front.

In one or more embodiments, the coating cavity 134 can have a normally lower surface 136, along which a substrate is intended to rest while passing through the coating cavity 134. Thus, since a coating material enters the coating cavity 134 via coating channel 130 at the normally upper portion and side portions of the coating cavity 134, a substrate having a four-sided lateral cross-section can primarily be coated on three of its four sides. In an alternate embodiment (not depicted) the portion of the lower surface 136 defined by the die body 116 and/or by the die plate 118 could be lowered or otherwise modified in order to allow coating material to surround and coat a passing substrate on all sides.

The coating cavity 134 can have any dimensions suitable for facilitating contact between a coating material and a substrate passing therethrough. In one or more embodiments, the coating cavity 134 can have a width in the range of from about 0.5 to about 24 inches, in the range of from about 1 to about 18 inches, or in the range of from 1.5 to 12 inches. In various embodiments, the coating cavity 134 can have a height in the range of from about 0.1 to about 12 inches, in the range of from about 0.125 to about 8 inches, or in the range of from 0.25 to 4 inches.

Figure 3C:
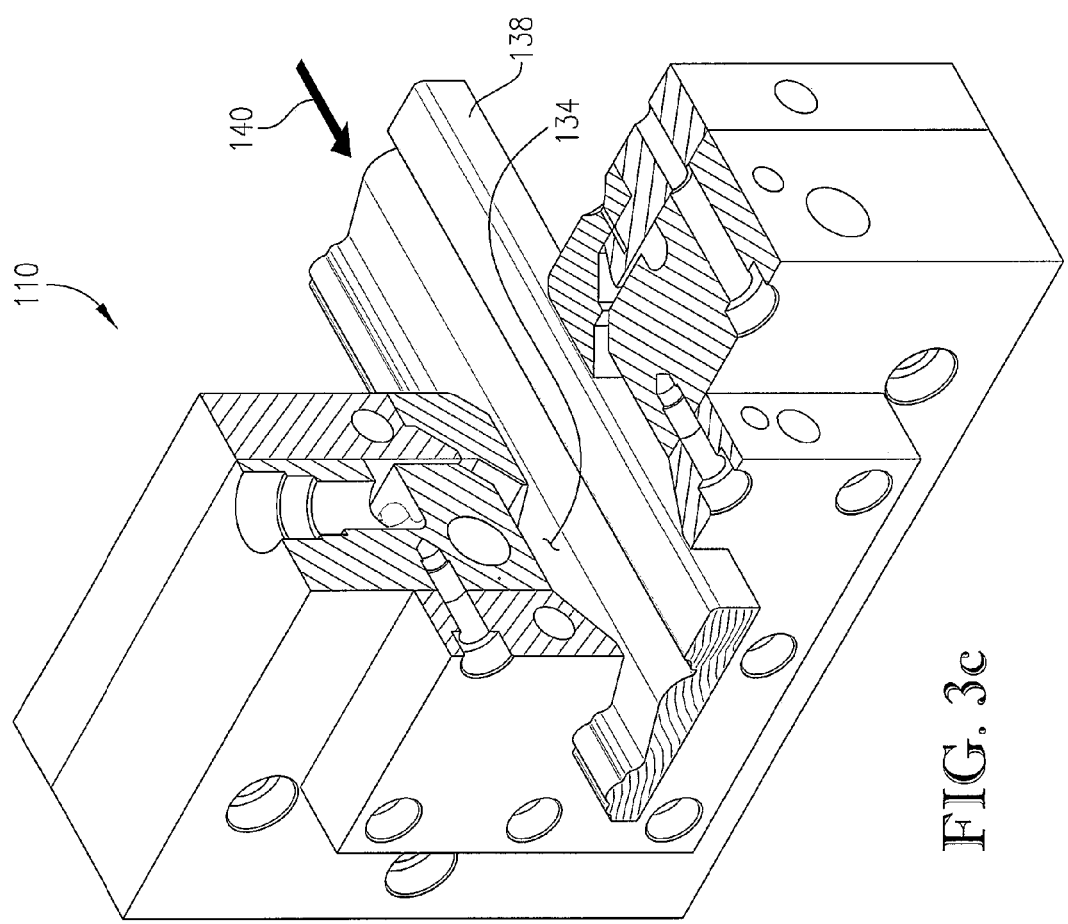
FIG. 3c is a cut away top/front isometric view of the die depicted in FIGS. 2a-e, particularly illustrating a substrate passing through the die via a substrate inlet, coating cavity, and substrate outlet.

FIG. 3c is a cut away top/front isometric view of the die 110 having a substrate 138 passing through the coating cavity 134 in the direction indicated by arrow 140. As will be discussed in greater detail below, the substrate 138 can have a lateral cross-section substantially corresponding in shape to the substrate inlet and substrate outlet of the die 110.

Referring now to FIGS. 4a-d, the guide plug 112 is depicted detached from the die 110 and in detail. A rear face 142 of the guide plug 112 presents a substrate inlet 144 having a rectangular concave entrance 146 that converges on an inner profile 148 having a normally upper curvilinear surface 150, two opposing side surfaces 152a,b, and a normally lower surface 154. In one or more embodiments, the inner profile 148 can have a non-circular lateral cross-section profile at any point taken orthogonal to the direction of intended substrate passage (e.g., the arrow 140 of FIG. 3c).

In the embodiment depicted in FIGS. 4a-d, the lower surface 154 does not extend as far forwardly as the upper surface 150 and the side surfaces 152a,b. In one or more embodiments, the lower surface 154 can be planar or substantially planar. Additionally, the lower surface 154 can be positioned horizontally or substantially horizontally during use. In alternate embodiments (not depicted), the lower surface 154 can present a curvilinear profile having one or more convex and/or concave surfaces. The opposing side surfaces 152a,b can be planar or substantially planar, and can be positioned vertically or substantially vertically during use. In alternate embodiments (not depicted), the side surfaces 152a,b can individually present curvilinear profiles having one or more convex and/or concave surfaces. Furthermore, the upper surface 150 can present a curvilinear profile having at least one concave surface and at least one convex surface. In one or more embodiments, the upper surface 150 can present a plurality of concave surfaces and/or a plurality of convex surfaces. Additionally, the upper surface 150 can present at least one, at least two, or at least three planar surfaces. In alternate embodiments (not depicted), the upper surface 150 can be planar or substantially planar. The intersections between the lower surface 154, the side surfaces 152a,b, and the upper surface 150 can be rounded, angled, or squared.

As noted above, the guide plug 112 can comprise the apertures 124a,b, which extend through the guide plug 112 and can be used for removably the coupling the guide plug 112 to the die block 120, as depicted in FIG. 2d.

As shown in FIGS. 4a-d, in one or more embodiments the guide plug 112 can have an outer profile 156. The outer profile 156 can be substantially rectangular in shape and can have one or more rounded corners. Additionally, the guide plug 112 can have an outer profile protrusion 156a that houses the inner profile 148. The outer profile protrusion 156a can extend forwardly from a front face 158 of the guide plug 112. The outer profile protrusion 156a can have any shape sufficient to house the inner profile 148. In one or more embodiments, the outer profile protrusion 156a can have a shape that tapers in the forward direction. Additionally, the outer profile protrusion 156a can have an elongated, substantially frusto-pyramidal shape, tapering forwardly from the front face 158. As can perhaps best be seen in FIGS. 3a-c, when the die 110 is assembled, at least a portion of the outer profile protrusion 156a can define at least a portion of the coating cavity 134, described above with reference to FIGS. 3a-c. In one or more embodiments, the outer profile 156 and the outer profile protrusion 156a can be correspondingly shaped to allow the guide plug 112 to be seated in the back plate 114, as depicted in FIG. 2d.

Referring still to FIGS. 4a-d, the guide plug 112 can have any dimensions suitable to allow passage of a substrate having a desired lateral cross-section profile and size therethrough. In one or more embodiments, the inner profile 148 of the guide plug 112 can have a width in the range of from about 0.5 to about 24 inches, in the range of from about 1 to about 18 inches, or in the range of from 1.5 to 12 inches. In one or more embodiments, the inner profile 148 can have a maximum height in the range of from about 0.1 to about 12 inches, in the range of from about 0.125 to about 8 inches, or in the range of from 0.25 to 4 inches. In one or more embodiments, the inner profile 148 can have a maximum depth in the range of from about 0.25 to about 6 inches, in the range of from about 0.5 to about 5 inches, or in the range of from 1 to 4 inches.

Though not depicted, various embodiments contemplate one or more alternate guide plugs having various inner profiles with different lateral cross-sections and/or different sizes that can be substituted for the guide plug 112. Such alternate guide plugs can have the same or substantially the same outer profiles as the outer profile 156 and the outer profile protrusion 156a to allow the selected alternate guide plug to be seated in the back plate 114 without also having to employ an alternate back plate. Such a substitution can allow the die 110, as shown in FIGS. 2a-e, to be used for coating substrates having different lateral cross-section profiles without replacing the entire die.

Referring now to FIGS. 5a-d, the back plate 114 is depicted detached from the die 110 and in detail. A rear face 160 of the back plate 114 defines a recessed guide plug seat 162 configured to permit a guide plug, such as the guide plug 112 described above with reference to FIGS. 4a-d, to be seated therein. With the exception of the recessed guide plug seat 162, the rear face 160 of the back plate 114 can be planar or substantially planar. The recessed guide plug seat 162 can further define a guide plug seat opening 164. The guide plug seat opening 164 can be shaped to allow a substrate, such as will be described in greater detail below, to pass therethrough. Additionally, the guide plug seat opening 164 can be shaped to allow at least a portion of the outer profile protrusion 156a of the guide plug 112 to extend at least partially or completely through the back plate 114.

In one or more embodiments, the recessed guide plug seat 162 can correspond closely enough in shape to the outer profile 156 and the outer profile protrusion 156a to create an airtight or substantially airtight seal at the interface between the guide plug 112 and the back plate 114 when the guide plug 112 is coupled to the back plate 114. Such a configuration can aid in controlling pressurization inside the coating cavity 134 of the die 110, described above with reference to FIGS. 3a-c. Additionally, the recessed guide plug seat 162 can comprise apertures 166a,b corresponding in size and location to the apertures 124a,b of the guide plug 112 (described above with reference to FIGS. 4a-d) to allow coupling of the guide plug 112 to the back plate 114. In one or more embodiments, the apertures 166a,b extend only partially through the back plate 114. Additionally, the apertures 166a,b can be threaded apertures.

As can best be seen in FIGS. 5c and 5d, the back plate 114 presents a front face 168. In one or more embodiments, the front face 168 can be planar or substantially planar. Additionally, the front face 168 can present apertures 170a,b,c,d,e,f, which can be threaded apertures. The apertures 170a,b,c,d,e,f can correspond in location and size to the apertures 122a,b,c,d,e,f through the die body 116, described above in FIG. 2e. The apertures 170a,b,c,d,e,f can extend at least partially through the back plate 114. Thus, the apertures 170a,b,c,d,e,f can facilitate coupling of the back plate 114 and the die body 116. Furthermore, as will be described in greater detail below, when the back plate 114 is coupled to the die body 116, the front face 168 can form at least a portion of the coating supply channel 130, described above with reference to FIG. 2a.

The back plate 114 can have any dimensions suitable to provide a recessed guide plug seat 162 large enough to receive the guide plug 112, and to provide the front face 168 large enough to act as a portion of the coating supply channel 130.

Referring now to FIGS. 6a-d, the die body 116 is depicted detached from the die 110 and in detail. A rear face 172 of the die body 116 presents the coating supply channel 130, a recessed surface 174, and the apertures 122a,b,c,d,e,f. With the exception of the coating supply channel 130 and the recessed surface 174, the rear face 172 of the die body 116 can be planar or substantially planar. The rear face 172 further presents a die body void 176 extending through the die body 116. The die body void 176 can be shaped to allow a substrate, such as will be described in greater detail below, to pass therethrough. Furthermore, at least a portion of the die body void 176 can constitute at least a portion of the coating cavity 134, described above with reference to FIGS. 3a-c.

Coating channel 130 can have any shape or configuration suitable to permit a coating material received via coating material inlet 126 to flow into the die body void 176 (and, consequently, into the coating cavity 134). As noted above with reference to FIGS. 5a-d, the front face 168 of the back plate 114 can form the remaining portion of coating channel 130 when coupled to the die body 116. Thus, in operation, a coating material received in coating channel 130 from the coating material inlet 126 can flow through coating channel 130, then through a void space created between the recessed surface 174 and the front face 168 of the back plate 114, and into the die body void 176. Although not depicted here, it is contemplated by various embodiments of the present invention that a coating channel could envelop all sides of the die body void 176, particularly in applications where it is desired to completely coat all sides of a substrate passing therethrough. In such a scenario, the recessed surface 174 could also extend completely around the die body void 176 to permit flow of the coating material to the normally bottom side of the substrate.

In one or more embodiments, the die body void 176 can be defined by two opposing side surfaces 178a,b, an upper surface 180, and a lower surface 182. The side surfaces 178a,b can be coplanar or substantially coplanar along the direction of intended substrate passage through the die 110 (e.g., arrow 140 of FIG. 3c), and the upper surface 180 can be coplanar or substantially coplanar with the lower surface 182 along the direction of intended substrate passage through the die 110. Additionally, one or more of the side surfaces 178a,b, the upper surface 180, or the lower surface 182 can be tapered inwardly from the rear face 172 before extending in the direction of intended substrate passage. In one or more embodiments, each of the side surfaces 178a,b and the upper surface 180 is initially tapered inwardly from the rear face 172. Additionally, the intersections between side surfaces 178a,b, upper surface 180, and lower surface 182 can individually be rounded, angled, or squared.

Referring now to FIGS. 6c and 6d, the die body 116 presents a front face 184. In one or more embodiments, the front face 184 can be planar or substantially planar. As noted above, the front face 184 defines the apertures 122a,b,c,d,e,f. In one or more embodiments, the die body 116 can be coupled to the back plate 114 with fasteners (e.g., bolts) extending through the apertures 122a,b,c,d,e,f and into the apertures 170a,b,c,d,e,f located on the front face 168 of the back plate 114. In one or more embodiments, the die body 116 can be coupled to the back plate 114 in such a manner as to create an airtight or substantially airtight seal at the interface between the die body 116 and the back plate 114. Such a configuration can aid in controlling pressurization inside the coating cavity 134 of the die 110, described above with reference to FIGS. 3a-c. Additionally, such a configuration can aid in deterring or preventing coating material from escaping the die 110 during use.

The front face 184 of the die body 116 additionally presents apertures 186a,b,c,d,e,f,g,h, which can be threaded apertures. The apertures 186a,b,c,d,e,f,g,h can correspond in location and size to apertures 132a,b,c,d,e,f,g,h of the die plate 118, as described above with reference to FIG. 2e. Apertures 186a,b,c,d,e,f,g,h can extend at least partially through the die body 116. In various embodiments, apertures 186a,b,c,d,e,f,g,h extend only partially through the die body 116.

Referring now to FIGS. 7a-d, the die plate 118 is depicted detached from the die 110 and in detail. A rear face 188 of the die plate 118 presents apertures 132a,b,c,d,e,f,g,h. In one or more embodiments, the rear face 188 of the die plate 118 can be planar or substantially planar. The rear face 188 further presents a substrate outlet 190 extending through the die plate 118. The substrate outlet 190 can be shaped to allow a substrate and coating material, such as will be described in greater detail below, to be discharged from the die 110 (discussed above with respect to FIGS. 2a-e). Furthermore, at least a portion of the substrate outlet 190 can constitute at least a portion of the coating cavity 134, described above with reference to FIGS. 3a-c. The substrate outlet 190 can be defined by a normally upper surface 192, two opposing side surfaces 194a,b, and a normally lower surface 196. In one or more embodiments, the substrate outlet 190 can have a non-circular lateral cross-section profile at any point taken orthogonal to the direction of intended substrate passage (e.g., arrow 140 of FIG. 3c). In one or more embodiments, the substrate outlet 190 can be tapered from the rear face 188 to a front face 198 of the die plate 118. Additionally, in various embodiments, at least two or at least three of the upper surface 192, the opposing side surfaces 194a,b, or the lower surface 196 can converge from the rear face 188 to the front face 198 of the die plate 118.

Referring still to FIGS. 7a-d, in one or more embodiments, the lower surface 196 can be planar or substantially planar. In alternate embodiments (not depicted), the lower surface 196 can be curvilinear, presenting one or more convex and/or concave surfaces. Additionally, the lower surface 196 can be positioned horizontally or substantially horizontally during use. In an alternate embodiment (not depicted), the lower surface 196 can taper upwardly from the rear face 188 to the front face 198 of the die plate 118 at any angle in the range of from about 1 to about 89°, in the range of from about 5 to about 60°, or in the range of from 10 to 45°. The opposing side surfaces 194a,b can be planar or substantially planar, and can be positioned vertically or substantially vertically during use. In alternate embodiments (not depicted), the side surfaces 194a,b, can individually be curvilinear, presenting one or more convex and/or concave surfaces. In one or more embodiments, as depicted in FIGS. 7a-d, one or both of the opposing side surfaces 194a,b can taper inwardly from the rear face 188 to the front face 198 of the die plate 118. The opposing side surfaces 194a,b can individually taper inwardly at any angle in the range of from about 1 to about 89° or in the range of from about 5 to about 60°. The upper surface 192 can present a curvilinear profile having at least one concave surface and at least one convex surface. In one or more embodiments, the upper surface 192 can present a plurality of concave surfaces and/or a plurality of convex surfaces. Additionally, the upper surface 192 can present at least one, at least two, or at least three planar surfaces. In alternate embodiments (not depicted), the upper surface 192 can be planar or substantially planar. Furthermore, in various embodiments, the upper surface 192 can taper downwardly from the rear face 188 to the front face 198 of the die plate 118 at any angle in the range of from about 1 to about 89° or in the range of from about 5 to about 60°. The intersections between the lower surface 192, the opposing side surfaces 194a,b, and the upper surface 196 can be rounded, angled, or squared.

The front face 198 of the die plate 118 defines a final profile 200 of the substrate outlet 190. In one or more embodiments, the final profile 200 can have the same or substantially the same shape as the inner profile 148 of the guide plug 112, discussed above with reference to FIGS. 4a-d. In various embodiments, the area defined by the final profile 200 can be greater than the area defined by a lateral cross-section of the inner profile 148 of the guide plug 112. Such an arrangement can allow for the increased size of the substrate due to coating material having been applied thereon. Additionally, the size of the final profile 200 can determine, at least in part, the thickness of the coating on the substrate. Thus, in one or more embodiments, the final profile 200 can be on average at least 1, at least 2, or at least 5 mils larger on at least three sides of its perimeter than a lateral cross-section of the inner profile 148 of the guide plug 112. In other embodiments, the final profile 200 can be on average about 1 to about 20 mils, about 20 to about 15 mils, or 5 to 10 mils larger on at least three sides of its perimeter than a lateral cross-section of the inner profile 148 of the guide plug 112.

The front face 198 of the die plate 118 additionally presents apertures 132a,b,c,d,e,f,g,h, which can be threaded apertures. Apertures 132a,b,c,d,e,f,g,h can correspond in location and size to the apertures 186a,b,c,d,e,f,g,h of the die body 116, as described above with reference to FIG. 6c. Apertures 132a,b,c,d,e,f,g,h can extend completely through the die plate 118 to permit coupling of the die plate 118 to the die body 116. As noted above with reference to FIGS. 2a-e, the die plate 118 can be removably coupled to the die body 116. In one or more embodiments, the die plate 118 can be coupled to the die body 116 in such a manner as to create an airtight or substantially airtight seal at the interface between the die plate 118 and the die body 116. Such a configuration can aid in controlling pressurization inside the coating cavity 134 of the die 110, described above with reference to FIGS. 3a-c. Additionally, such a configuration can aid in deterring or preventing coating material from escaping the die 110 during use.

Referring now to FIGS. 8a-c, an alternate configuration of the die plate 118 is depicted having a substrate outlet 202 with feathering channels 204a,b. As used herein, the term "feathering" shall denote a condition where a coating on a substrate is wrapped around the edge of a substrate between a coated surface and an uncoated surface. Thus, when the die plate 118 is employed to primarily coat three sides of a 4-sided substrate, the feathering channels 204a,b can allow a coating material to partially coat or "wrap around" the substrate edges to coat a portion of the fourth side of the substrate. The width of the feathering channels 204a,b can vary depending on the amount of feathering desired. In one or more embodiments, the width of the feathering channels 204a,b at the final profile 206 can be in the range of about 0.1 to about 1.5 inches or in the range of 0.3 to 0.8 inches. The depth of the feathering channels 204a,b can be any depth suitable to accomplish the desired amount of feathering on a passing substrate. In various embodiments, feathering channels 204a,b can have individual depths in the range of from about 1 to about 20 mils, in the range of from about 2 to about 15 mils, or in the range of from 3 to 10 mils.

Though not depicted, various embodiments contemplate one or more alternate die plates having various inner profiles with different lateral cross-sections and/or different sizes that can be substituted for the die plate 118. Such alternate die plates can have the same or substantially the same dimensions as the die plate 118 to allow the selected alternate die plate to be removably coupled to the die body 116 without also having to employ a second die body. Such a substitution can allow the die 110, as shown in FIGS. 2a-e, to be used for coating substrates having different lateral cross-section profiles without replacing the entire die.

Figure 9:
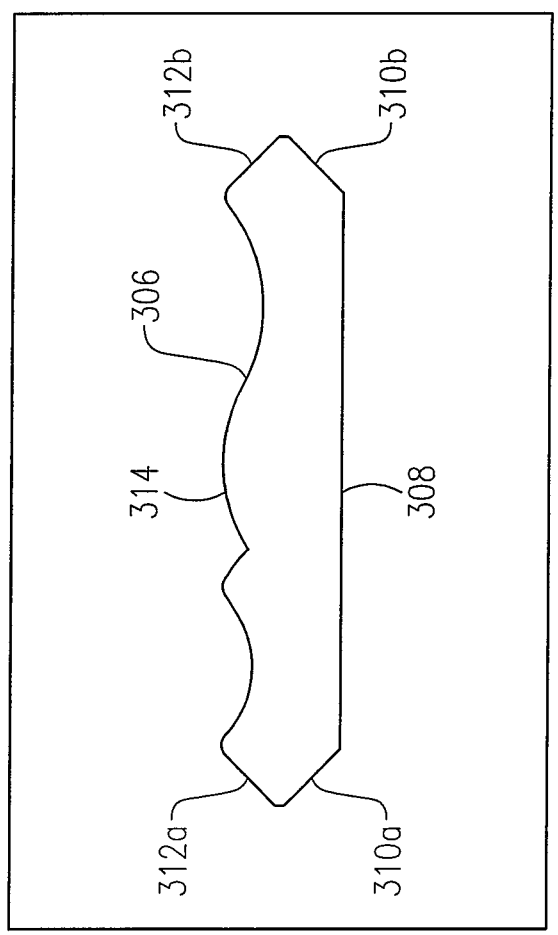
FIG. 9 is an enlarged view of an alternative shape for the substrate inlet and outlet of the die.

FIG. 9 provides one example of an alternative shape for the substrate inlet and outlet of the die. The inner profile 306 of the substrate inlet/outlet depicted in FIG. 9 can be used in a die for coating a six-sided substrate (e.g., crown molding). The profile 306 can include a bottom surface 308, two lower side surfaces 310 a,b, two upper side surfaces 312 a,b, and a top curvilinear surface 314. In one embodiment, a coating material can be applied at the top surface 314 and upper side surfaces 312 a,b; but, not at the bottom surface 308 or lower side surfaces 310 a,b. In another embodiment, a coating can be applied at the top surface 314, the upper side surfaces 312 a,b, and the lower side surfaces 310 a,b; but, not at the bottom surface 308. Further, feathering of the coating can be optionally provided by feathering channels (not shown) located at the intersection of the upper and lower side surfaces 312 a,b and 310 a,b or at the intersection of the lower side surfaces 310 a,b and the bottom surface 308.

Referring again to FIG. 1, in one or more embodiments, the above-described die 110 can be employed as the die 10 in the coating system 12 depicted in FIG. 1. As mentioned above, a substrate can initially be introduced into a pretreatment zone 14 of the coating system 12. In various embodiments, the substrate employed in the coating system 12 can be any substrate suitable for extrusion coating. Additionally, in various embodiments, the substrate can be rigid or substantially rigid. Furthermore, the substrate can be an elongated substrate. When the die 110, described above, is employed as the die 10 in the coating system 12, the substrate can have a lateral cross-section profile corresponding or substantially corresponding in shape to the inner profile 148 of the substrate inlet 144 and the final profile 200 of the substrate outlet 190. In various embodiments, the substrate can be precisely milled such that a lateral cross-section of the substrate has an average clearance through the inner profile 148 of the substrate inlet 144 of less than 10, less than 7, or less than 5 mils. Also, a lateral cross-section of the substrate can have an average clearance through the inner profile 148 of the substrate inlet 144 of at least 1 or at least 2 mils. Additionally, a lateral cross-section of the substrate can have an average clearance through the final profile 200 or 206 of the substrate outlet 190 or 202, respectively, of at least 1, at least 3, or at least 5 mils. Moreover, a lateral cross-section of the substrate can have an average clearance through the final profile 200 or 206 of the substrate outlet 190 or 202, respectively, of less than 20, less than 15, or less than 10 mils. The substrate employed in the coating system 12 can be formed of any suitable material. In one or more embodiments, the substrate can comprise wood, wood hybrid products, plastics, metals, fiberglass, or mixtures of two or more thereof. Additionally, in various embodiments, the substrate can be in the form of trim or molding boards.

As noted above, the substrate in the coating system 12 can first be introduced into a pretreatment zone 14. The pretreatment zone 14 can comprise one or more stages that may be performed prior to coating a substrate. For example, the pretreatment zone 14 can include an apparatus that takes an initial blank stock substrate and forms it into a desired shape, such as, for example, taking a wood, plastic, or metal blank stock and milling it to a desired profile and length. Additionally, it may be useful to clean the surface of the substrate prior to coating. The cleaning stage or stages can include high pressure steam cleaning, high pressure air cleaning, solvent cleaning application, water bath cleaning, or other types of cleaning stages typically appropriate for the type of substrate employed in the coating system 12. The pretreatment zone 14 can also include a stain bath for staining the substrate.

Following pretreatment, the substrate can be introduced into the dryer 16. The dryer 16 can be employed to heat at least the surface of the substrate, which can help prevent vapor bubbles from forming under the coating material of the coated substrate. Drying the substrate in the dryer 16 can additionally remove surface moisture from the substrate to more precisely control the size of the substrate, which can vary with moisture content (i.e., moisture swelling). In one or more embodiments, the substrate can be dried in the dryer 16 for at least 5, at least 10, or at least 20 seconds. Also, drying in the dryer 16 can be performed at a temperature of at least 250, at least 300, or at least 350° F.

Following drying in the dryer 16, the substrate can be introduced into the die 10 with the aid of the feeder 18. The feeder 18 can comprise any methods or apparatus configured to push the substrate into and at least partially through the die 10. Additionally, the feeder 18 can be operable to properly align the substrate with a substrate inlet of the die 10, such as, for example, the substrate inlet 144 of the die 110, described above. In one or more embodiments, the feeder 18 can comprise a plurality of rollers (not shown) powered by, for example, electric motors to engage and push the substrate into the die 10. Such powered rollers can be positioned above and below the path of the substrate through the feeder 18. The top and bottom rollers can maintain vertical alignment of the substrate with the substrate inlet of the die 10. Additionally, the feeder 18 can comprise a plurality of side rollers (which may or may not be powered) positioned on either side of the substrate's path through the feeder 18. Such side rollers can engage the sides of the substrate and maintain lateral alignment of the substrate with the substrate inlet of the die 10.

The feeder 18 can be configured to supply individual substrate members to the die 10 in a substantially continuous manner. In one embodiment, the individual substrate members are fed to the die 10 in a butt-to-butt manner, where contact is maintained between the back end of a first substrate member and the front end of a second substrate member fed behind the first substrate member.

The die 10 of the coating system 12 can facilitate contact between a coating material received from the coating material source 20 via line 26 and the incoming substrate. In one or more embodiments, the die 10 can be substantially the same as the die 110, described above with reference to FIGS. 2-8. The pressure in the die 10 during the coating process can be at least 25, at least 50, or at least 100 pounds per square inch ("psi"). Additionally, the pressure in the die 10 during the coating process can be in the range of from about 25 to about 2,000 psi, in the range of from about 50 to about 1,500 psi, or in the range of from 100 to 1,000 psi. Also, the temperature in the die 10 during the coating process can be any temperature sufficient to maintain the incoming coating material in a liquid or substantially liquid state. In one or more embodiments, the temperature in the die 10 during the coating process can be at least 100, at least 200, or at least 400° F. Additionally, the temperature in the die 10 during the coating process can be in the range of from about 100 to about 1,000° F., in the range of from about 200 to about 750° F., or in the range of from 400 to 600° F.

Various embodiments described herein can allow for high feed rates of the substrate through the die 10. In one or more embodiments, a substrate can pass through the die 10 at a line speed of at least 10, at least 25, or at least 50 feet per minute. Additionally, a substrate can pass through the die 10 at a line speed in the range of from about 10 to about 500 feet per minute, in the range of from about 25 to about 400 feet per minute, or in the range of from 50 to 250 feet per minute.

The coating material introduced into the die 10 via line 26 can be any coating material suitable for coating a substrate. In various embodiments, the coating material can be a coating material suitable for use in an extrusion coating die. Additionally, the coating material can comprise one or more polymers, such as thermoplastic polymers. Examples of polymers or polymer resins suitable for use in coating materials employed with the coating system 12 include, but are not limited to, polyesters, such as polyethylene terephthalate or polyethylene terephthalate glycol; polypropylenes, polyethylene, or other polyolefins; polyvinyl chlorides; acrylonitrile styrene acrylate copolymer; or mixtures of two or more thereof. The polymer components can be present in the coating material in an amount ranging from about 10 to about 100 weight percent, or about 30 to about 70 weight percent, based on the entire weight of the coating material.

The coating material can also comprise additional components typically included in coating formulations, such as, for example, color pigment, UV stabilizers, compatibilizers, rubbers, gloss modifiers (e.g., calcium carbonate), opacity modifiers (e.g., titanium dioxide), impact modifiers (e.g., styrene-butadiene-styrene polymers, acrylonitrile-butadiene-styrene polymers, or methacrylate-butadiene-styrene polymers), and other types of stabilizers typically employed to ensure a durable and appealing finish to the coating applied to the substrate. In one or more embodiments, gloss modifiers can constitute in the range of from about 10 to about 40 weight percent of the coating material, based on the entire weight of the coating material. Additionally, in various embodiments, opacity modifiers can constitute in the range of from about 1 to about 10 weight percent of the coating material, based on the entire weight of the coating material. Furthermore, in various embodiments, impact modifiers can constitute in the range of from 0 to about 20 weight percent of the coating material, based on the entire weight of the coating material. Other optional elements, such as UV stabilizers or emulsifiers, can be present in individual amounts ranging from 0 to about 20 weight percent of the coating material, based on the entire weight of the coating material.

In various embodiments, the coating material introduced into the die 10 can have a low residence time therein. When the die 110 (as described above with reference to FIGS. 2-8) is employed as the die 10 in the coating system 12, the coating material can have an average residence time in the coating cavity 134 of less than 60, less than 50, less than 40, or less than 30 seconds. Additionally, the coating material can have an average residence time in the coating cavity 134 in the range of from about 1 to about 60 seconds, in the range of from about 5 to about 50 seconds, or in the range of from 10 to 40 seconds. Furthermore, the coating material can have a maximum residence time in the coating cavity 134 of less than 120, less than 100, less than 80, or less than 60 seconds.

The coating material source 20 can be any apparatus or container operable to provide a coating material, such as described above, to a die. In one or more embodiments, the coating material source 20 can be an extruder. When the coating material source 20 comprises an extruder, the coating material can initially be introduced into the coating material source 20 in a substantially solid form, such as pellets or a powder. The coating material source 20 can operate to heat the initial coating material until it is molten or substantially molten. Such molten coating material can then be extruded to the die 10 and employed as described above. The screw speed of the extruder during the coating process can range from about 1 to about 200 rpm, or from about 2 to about 100 rpm.

Following the coating process, the substrate can be discharged from the die 10. Thereafter, the substrate can be introduced into the pressure box 22. In various embodiments, the pressure box 22 can be used in addition to or in the alternative to the dryer 16, described above. The pressure box 22 can provide a pressurized environment for the coating material to cool on the substrate. The pressure box 22 can maintain a pressure in the range of from 20 to 100 psi, in the range of from 25 to 80 psi, or in the range of from 30 to 60 psi. Though not wishing to be bound by theory, it is thought that maintaining such pressure prevents vapor from rising to the surface while the coating material cools, thus preventing surface bubbles in the final coating.

Following optional treatment in the pressure box 22, the coated substrate can optionally be passed through the blasting system 24. The blasting system 24 is designed to pit the surface for additional paint adhesion to the coated substrate surface via mechanical interlocking. Any type of aggregate blasting material can be employed in the blasting system 24. In various embodiments, the blasting material can comprise sand. The type of blasting material, geometry of the material, and pressure level are all variables in achieving desired surfaces.

Following optional treatment in the pressure box 22 and/or the blasting system 24, a coated substrate can be discharged from the coating system 12. In one or more embodiments, the coated substrate can have an average coating thickness of less than 40, less than 20, or less than 15 mils. Furthermore, the coated substrate can have an average coating thickness of at least 1, at least 3, or at least 5 mils. Additionally, the coated substrate can have an average coating thickness in the range of from about 1 to about 40 mils, in the range of from about 2 to about 20 mils, or in the range of from 3 to 15 mils. The above-recited values for "average coating thickness" are determined based on the amount of coating material consumed during steady state coating of the substrate. For example, average coating thickness can be calculated by dividing the total volume of coating material consumed by the total surface area coated with that material.

Various embodiments of this invention can be further illustrated by the following examples, although it will be understood that these examples are included merely for the purposes of illustration and are not intended to limit the scope of the invention unless otherwise specifically indicated.

EXAMPLES

Example 1

Control of Coating Thickness by Pressurization

Employing a die substantially as depicted in FIGS. 2-8, the effect of pressure during an extrusion coating process was determined. The ability to control pressure during the extrusion coating process helps to control the thickness of the coating onto the substrate. Medium density fiberboard substrates were coated using a composition containing 65% Eastman Eastar® 6763 PETG copolyester, 20% calcium carbonate #10 white, 10% Kane Ace KAB 564 impact modifier, and 5% titanium dioxide. Table 1, below, shows various pressures and speeds at which the substrate was fed through the die.

TABLE 1

Coating Thickness Control

| Sample Number | Extruder/Die Temp (° F.) | Board Feed (feet/min) | Screw (rpm) | Pressure (psi) | Coating Thickness (mils) |
|---|---|---|---|---|---|
| 1 | 500 | 50 | 2.5 | — | 6.0 |
| 2 | 500 | 45 | 2.5 | — | 7.0 |
| 3 | 500 | 40 | 2.5 | 80 | 7.3 |
| 4 | 500 | 35 | 2.5 | 200 | 7.5 |
| 5 | 500 | 100 | 6.5 | 40 | 4.5 |
| 6 | 500 | 95 | 6.5 | 40 | 4.8 |
| 7 | 500 | 90 | 6.5 | 40 | 5.7 |
| 8 | 500 | 85 | 6.5 | 60 | 6.0 |
| 13 | 500 | 80 | 6.5 | 130 | 6.3 |
| 14 | 500 | 75 | 6.5 | 160 | 5.8 |
| 15 | 500 | 70 | 6.5 | 170 | 5.8 |
| 16 | 500 | 65 | 6.5 | 200 | 7.3 |
| 17 | 500 | 60 | 6.5 | 360 | 7.6 |
| 9 | 500 | 150 | 11.9 | 160 | 5.0 |
| 10 | 500 | 145 | 11.9 | 160 | 4.8 |
| 11 | 500 | 140 | 11.9 | 170 | 5.8 |
| 12 | 500 | 135 | 11.9 | 120 | 5.9 |
| 18 | 500 | 130 | 11.9 | 170 | 6.3 |
| 19 | 500 | 125 | 11.9 | 200 | 5.9 |
| 20 | 500 | 120 | 11.9 | 230 | 5.6 |
| 21 | 500 | 115 | 11.9 | 270 | 7.0 |
| 22 | 500 | 110 | 11.9 | 330 | 7.2 |
| 23 | 500 | 105 | 11.9 | 290 | 7.1 |
| 24 | 500 | 100 | 11.9 | 360 | 7.4 |

The pressure can be increased by pumping more coating material to the coating die for a given board feed rate. This increase in pressure is clearly seen in Table 1, above. The increase in pressure also leads to a thicker coating on the substrate. Though not wishing to be bound by theory, it is postulated that the thicker coating may also be due in part to the compression of the substrate used in this particular example. The substrate used for this example was 42-lb medium density fiberboard, which was milled to the exact dimensions required for coating. The compression of the substrate will vary from substrate to substrate and may need to be accounted for when determining the pressures required for a particular thickness coating. Factors that affect the thickness of the coating include, but are not limited to, temperature of polymer melt, temperature of the substrate, compressive modulus of the substrate, dimensions of the substrate relative to the die, pressure in the die, and line speed. The ability of a die substantially as shown in FIGS. 2a-e and 8a-c to precisely control the pressure as well as other process conditions allows for precise control of the coating thickness on the substrate.

Example 2

Control of Peel Strength by Pressurization

The ability to control pressure during the extrusion coating process using a die substantially as shown in FIGS. 2-8 also helps to control the adhesion of the coating on the substrate. Generally, as the pressure on the substrate during the coating process is increased, the adhesion of the coating on the surface increases. This adhesion can be tested with a peel tester. The amount of adhesion of the coating onto the substrate is dependent on the type of substrate being coated as well.

The adhesion of the coating to the substrate material was measured using a 90° peel test on an Adhesion/Release Tester AR-1000 manufactured by ChemInstruments in Fairfield, Ohio, with a 10-lb load cell. The test specimens were prepared using a 9"×½" template to trace the peel sample with a razor blade. The samples were fixed in the sliding 90° peel rig and tested at a peel rate of 12 inches per minute. The average peel force was then recorded. In addition to peel force, the observable level of fiber pull-off was also evaluated. The amount of residual substrate fiber on the back of the peel specimen was used to indicate the level of adhesion present. Three replicates for each sample were run to get an average peel test value.

The coating of each of the samples prepared in Example 1 was analyzed for average peel strength using the foregoing method. Table 2, below, provides the results of these analyses:

TABLE 2

Peel Strength Control

| Sample Number | Extruder/Die Temp (° F.) | Board Feed (ft/min) | Screw (rpm) | Pressure (psi) | Average Peel Strength (lbs) |
|---|---|---|---|---|---|
| 1 | 500 | 50 | 2.5 | — | 0.672 |
| 2 | 500 | 45 | 2.5 | — | 0.810 |
| 3 | 500 | 40 | 2.5 | 80 | 0.852 |
| 4 | 500 | 35 | 2.5 | 200 | 0.971 |
| 5 | 500 | 100 | 6.5 | 40 | 0.241 |
| 6 | 500 | 95 | 6.5 | 40 | 0.336 |
| 7 | 500 | 90 | 6.5 | 40 | 0.379 |
| 8 | 500 | 85 | 6.5 | 60 | 0.371 |
| 13 | 500 | 80 | 6.5 | 130 | 0.517 |
| 14 | 500 | 75 | 6.5 | 160 | 0.586 |
| 15 | 500 | 70 | 6.5 | 170 | 0.555 |
| 16 | 500 | 65 | 6.5 | 200 | 0.797 |
| 17 | 500 | 60 | 6.5 | 360 | 0.873 |
| 9 | 500 | 150 | 11.9 | 160 | 0.322 |
| 10 | 500 | 145 | 11.9 | 160 | 0.352 |
| 11 | 500 | 140 | 11.9 | 170 | 0.360 |
| 12 | 500 | 135 | 11.9 | 170 | 0.267 |
| 18 | 500 | 130 | 11.9 | 170 | 0.517 |
| 19 | 500 | 125 | 11.9 | 200 | 0.336 |
| 20 | 500 | 120 | 11.9 | 230 | 0.541 |
| 21 | 500 | 115 | 11.9 | 270 | 0.540 |
| 22 | 500 | 110 | 11.9 | 330 | 0.622 |
| 23 | 500 | 105 | 11.9 | 290 | 0.658 |
| 24 | 500 | 100 | 11.9 | 360 | 0.684 |

The peel strength of a coating can be influenced by several factors, including, but not limited to, the type of substrate, the compressive properties of the substrate, the surface roughness of the substrate, the porosity of the substrate, the shape of the profile, the speed of coating, the temperature of the polymer melt in the die, the amount of residence time of the substrate in the die, the temperature of the substrate, the thickness of the coating, the composition of the coating material, and the pressure inside the die. The ability to precisely control the above listed factors using a die substantially as shown in FIGS. 2-8 results in the ability to precisely control peel strength values, which can enable production of coated substrates able to satisfy the fitness for use criteria of a particular application.

It should be noted that each of samples 12 and 19 in Table 2 shows a lower peel strength value than expected. This may have been because the unmilled side of the medium density fiberboard was coated. Due to the presence of the unmilled smooth surface, there was not enough fiber on the surface for the polymer melt to adhere to, resulting in lower adhesion strength.

Example 3

Demonstration of Feathering

The ability to control pressure using a die substantially as shown in FIGS. 2-8 additionally enables the ability to control the amount of feathering on the uncoated side of the substrate. The samples prepared in Example 1 were further analyzed for the presence and amount of feathering. The analyzed samples were rated using the following rating system shown in Table 3, below:

TABLE 3

Rating System for Evaluating Feathering

| Feathering Indicators | 0 | No feathering |
|---|---|---|
| | 1 | Feathering started |
| | 2 | Half-distance feathering (relative to width of feathering channel) |
| | 3 | Full feathering (relative to width of feathering channel) |

Table 4, below, presents the results of the feathering analyses for the samples prepared in Example 1:

TABLE 4

Demonstration of Feathering in coating of substrate using E1 die

| Sample Number | Extruder/ Die Temp (° F.) | Board Feed (ft/min) | Screw (rpm) | Pressure (psi) | Feathering Rating |
|---|---|---|---|---|---|
| 1 | 500 | 50 | 2.5 | — | 1 |
| 2 | 500 | 45 | 2.5 | — | 2 |
| 3 | 500 | 40 | 2.5 | 80 | 3 |
| 4 | 500 | 35 | 2.5 | 200 | 3 |
| 5 | 500 | 100 | 6.5 | 40 | 0.5 |
| 6 | 500 | 95 | 6.5 | 40 | 0.5 |
| 7 | 500 | 90 | 6.5 | 40 | 0.5 |
| 8 | 500 | 85 | 6.5 | 60 | 0.5 |
| 13 | 500 | 80 | 6.5 | 130 | 1 |
| 14 | 500 | 75 | 6.5 | 160 | 2 |
| 15 | 500 | 70 | 6.5 | 170 | 2 |
| 16 | 500 | 65 | 6.5 | 200 | 3 |
| 17 | 500 | 60 | 6.5 | 360 | 3 |
| 9 | 500 | 150 | 11.9 | 160 | 0 |
| 10 | 500 | 145 | 11.9 | 160 | 0 |
| 11 | 500 | 140 | 11.9 | 170 | 0 |
| 12 | 500 | 135 | 11.9 | 170 | 0 |
| 18 | 500 | 130 | 11.9 | 170 | 0 |
| 19 | 500 | 125 | 11.9 | 200 | 0 |
| 20 | 500 | 120 | 11.9 | 230 | 1 |
| 21 | 500 | 115 | 11.9 | 270 | 1 |
| 22 | 500 | 110 | 11.9 | 330 | 2 |
| 23 | 500 | 105 | 11.9 | 290 | 2 |
| 24 | 500 | 100 | 11.9 | 360 | 2 |

Feathering prevents the presence of a precrack between the substrate and the coating, thus rendering the separation of the two difficult. This can be also viewed as the absence of a clear interface between the substrate and the coating. The absence of a clear interface between the coating and the substrate prevents easy peel off of the coating at the interface. The feathering thus allows for a better quality coating with improved edge peel strength to be put onto a substrate. Feathering also provides the coating a look of being painted as opposed to coextruded. This also tends to appease consumers who prefer painted surfaces over laminated or extrusion coated surfaces. The amount of undercut provided in the die plate can be influenced by several factors, including, but not limited to, the type of substrate, the compressive properties of the substrate, the shape of the profile, the speed of coating, the temperature of the polymer melt in the die, the temperature of the substrate and the pressure inside the die. The ability to control these factors using a die substantially as shown in FIGS. 2-8 helps control the amount of feathering on the underside of the substrate.

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A die for extrusion coating an elongated substrate, said die comprising:
   a die block defining at least a portion of a pressurizable coating cavity, said die block further defining a coating supply channel for supplying a pressurized coating material to said coating cavity;
   a guide plug removably coupled to said die block and defining a substrate inlet for receiving said substrate and directing said substrate towards said coating cavity, wherein said substrate inlet includes an inner profile and an entrance profile, with said inner profile having a lateral cross-section of a different shape than a lateral cross-section of said entrance profile; and a die plate removably coupled to said die block and defining a substrate outlet for discharging said substrate from said die, said substrate outlet having a non-circular lateral cross-section substantially corresponding in shape to the shape of said inner profile, wherein said die is configured to maintain an elevated pressure of at least 25 pounds per square inch (psi) in said coating cavity when said pressurized coating is supplied to said coating channel and said substrate is received in said substrate inlet, said coating cavity, and said substrate outlet, wherein said guide plug includes an outer profile protrusion that extends forward from a front face of said guide plug, and wherein said outer profile protrusion of said guide plug is correspondingly-shaped with at least a portion of said die block, so as to form a substantially airtight seal when said guide plug is coupled with said die block.

2. The die of claim 1, said cross-sections of said inner profile of said substrate inlet and said substrate outlet each comprising at least one curvilinear side, wherein said curvilinear side comprises at least one convex segment and at least one concave segment.

3. The die of claim 1, said die plate comprising a front face and a rear face, said rear face being adjacent to said die block, said substrate outlet being tapered from said rear face to said front face.

4. The die of claim 3, said substrate outlet having at least one normally lower surface, at least two normally side surfaces, and at least one normally upper surface, said normally upper surface having an average angle of decline in the range of from about 1° to about 89° from said rear face to said front face.

5. The die of claim 4, wherein at least two of said lower surface, side surfaces, or upper surface of said substrate outlet converge from said rear face to said front face.

6. The die of claim 1, said cross-section of said substrate outlet having an area that is greater than the area of the cross-section of said inner profile of said substrate inlet.

7. The die of claim 1, said die configured to extrusion coat an elongated substrate having a 4-sided, lateral cross-section, said die being operable to substantially completely coat three sides of said substrate and, optionally, being operable to coat a portion of the fourth side of said substrate.

8. The die of claim 1, said die configured to extrusion coat an elongated substrate having a 6-sided, lateral cross-section, said die being operable to substantially completely coat at least three sides of said substrate and, optionally, being operable to coat a portion of at least one other side of said substrate.

9. The die of claim 1, said guide plug extending partially into said die block, said coating cavity being further defined by a portion of said guide plug, said coating cavity being further defined by a portion of said die plate.

10. The die of claim 1, said die block comprising a back plate coupled to a die body, said guide plug being removably coupled to said back plate, said die plate removably coupled to said die body.

11. The die of claim 1, said die block further comprising a coating material inlet in fluid flow communication with said coating supply channel.

12. The die of claim 1, said die block, said guide plug, and said die plate being at least partially formed from an inert material.

13. The die of claim 1, wherein said die is configured to coat a substantially rigid elongated substrate, said coating cavity being aligned with said substrate inlet and said substrate outlet to permit the passage of said substantially rigid substrate therethrough.

14. The die of claim 1, said die plate defining at least one feathering channel adjacent the intersection of two sides of said substrate outlet.

15. The die of claim 1, said die plate comprising a front face and a rear face, said rear face being adjacent to said die block, said substrate outlet being tapered from said rear face to said front face, said substrate outlet having at least one normally lower surface, at least two normally side surfaces, and at least one normally upper surface, said normally lower surface tapering upwardly from said rear face to said front face at an average angle in the range of from about 1° to about 89°.

16. The die of claim 1, said die block further comprising a coating material inlet in fluid flow communication with said coating supply channel, said coating material inlet being located in or proximate to the upper surface of said die block.

17. The die of claim 1, at least a portion of said coating cavity having a lateral cross-section that does not correspond to the shape of said inner profile of said substrate inlet and does not correspond to the shape of said substrate outlet.

18. The die of claim 1, at least a portion of said coating cavity having a lateral cross-sectional area that is larger than the lateral cross-sectional area of said inner profile of said substrate inlet and is larger than the lateral cross-sectional area of said substrate outlet.

19. The die of claim 1, at least a portion of said coating cavity having a lateral cross-section that is substantially rectangular.

20. The die of claim 1, said die block comprising a die body void extending through at least a portion of said die block to at least partially define said coating cavity, wherein said die body void is defined by two opposing side surfaces, an upper surface, and a lower surface, wherein said side surfaces are substantially coplanar with one another along the direction of intended substrate passage through said die, wherein said upper surface is substantially coplanar with said lower surface along the direction of intended substrate passage through said die.

21. The die of claim 1, wherein said entrance profile of said guide plug has a rectangular-shaped lateral cross-section.

22. The die of claim 21, further wherein said entrance profile of said guide plug has concave, rectangular-shaped lateral cross-section.

23. A system for applying a pressurized coating material to an elongated substantially rigid substrate, said system comprising:

a die for contacting said substrate with said pressurized coating material, said die defining a pressurizable coating cavity, a coating supply channel, a substrate inlet, and a substrate outlet; and a substrate feeder for aligning said substrate with said substrate inlet and pushing said substrate at least partly through said die via said substrate inlet, coating cavity, and substrate outlet, wherein said die comprises a die block, a guide plug removably coupled to said die block, and a die plate removably coupled to said die block, wherein said guide plug defines said substrate inlet and said die plate defines said substrate outlet, wherein said guide plug includes an outer profile protrusion extending from a face of said guide plug for interfacing said guide plug with said die block, wherein said outer profile protrusion of said guide plug extends forward from a front face of said guide plug, wherein said outer profile protrusion of said guide plug is correspondingly-shaped with at least a portion of said die block, so as to form a substantially airtight seal when said guide plug is coupled with said die block, and wherein said die is configured to maintain an elevated pressure of at least 25 psi in said coating cavity when said pressurized coating is supplied to said coating cavity and said substrate is received in said substrate inlet, said coating cavity, and said substrate outlet.

24. The system of claim 23, further comprising at least one oven or dryer upstream of said feeder.

25. The system of claim 23, further comprising at least one pressure box downstream of said die.

26. The system of claim 23, further comprising at least one blast system downstream of said die.

27. The system of claim 23, further comprising a coating material source in fluid flow communication with said die and operable to supply said coating material to said die.

28. The system of claim 23, wherein said substrate outlet has a non-circular lateral cross-section substantially corresponding in shape to the lateral cross-section of said substrate inlet, wherein said cross-sections of said substrate inlet and said substrate outlet each comprise at least one curvilinear side, wherein said curvilinear side comprises at least one convex segment and at least one concave segment.

29. The system of claim 23, wherein said die plate comprises a front face and a rear face, wherein said rear face is adjacent to said die block, wherein said substrate outlet has at least one normally lower surface, at least two normally side surfaces, and at least one normally upper surface, wherein at least two of said lower surface, side surfaces, or upper surface of said substrate outlet converge from said rear face to said front face.

30. The system of claim 23, said die plate defining at least one feathering channel adjacent the intersection of two sides of said substrate outlet.

31. The system of claim 23, said substrate feeder being configured to introduce elongated substrates into said die in a substantially continuous manner, said substrate feeder being configured to push a second elongated substrate into said die behind a first elongated substrate in a butt-to-butt manner such that the back end of said first elongated substrate and the front end of said second elongated substrate contact one another.

32. The system of claim 23, further comprising a coating source in fluid communication with said coating supply channel of said die, said coating supply channel comprising a coating material inlet for receiving said pressurized coating material from said coating source, said coating material inlet being located in or proximate to the upper surface of said die block.

33. The system of claim 23, wherein at least a portion of said coating cavity has a lateral cross-section that does not correspond to the shape of said inner profile of said substrate inlet and does not correspond to the shape of said substrate outlet.

34. The system of claim 23, wherein at least a portion of said coating cavity has a lateral cross-sectional area that is larger than the lateral cross-sectional area of said inner profile of said substrate inlet and is larger than the lateral cross-sectional area of said substrate outlet.

35. The system of claim 23, wherein at least a portion of said coating cavity has a lateral cross-section that is substantially rectangular.

36. The system of claim 23, wherein said die block comprises a die body void extending through at least a portion of said die block to at least partially define said coating cavity, wherein said die body void is defined by two opposing side surfaces, an upper surface, and a lower surface, wherein said side surfaces are substantially coplanar with one another along the direction of intended substrate passage through said die, wherein said upper surface is substantially coplanar with said lower surface along the direction of intended substrate passage through said die.

37. The system of claim 23, wherein said outer profile protrusion of said guide plug tapers forward from the front face of said guide plug.

38. The system of claim 37, wherein said outer profile protrusion of said guide plug has an elongated, substantially frusto-pyramidical shape.

39. The system of claim 23, wherein said outer profile protrusion of said guide plug forms at least a portion of said coating cavity.

40. A method of coating a substrate, said method comprising:
  (a) introducing a pressurized coating material into a coating cavity of a die;
  (b) pushing a first elongated substrate into said die through a first substrate inlet;
  (c) passing said first elongated substrate through said coating cavity to contact said first elongated substrate with said coating material, wherein said coating material in said coating cavity is maintained at a pressure of at least 25 psi during said passing; and
  (d) discharging said first elongated substrate from said die through a first substrate outlet to form an at least partially coated first substrate,
  wherein said die comprises a die block, a guide plug, and a die plate,
  wherein said guide plug and said die plate are removably coupled to said die block,
  wherein said guide plug defines said first substrate inlet,
  wherein said substrate inlet includes an inner profile and an entrance profile, with said inner profile having a lateral cross-section of a different shape than a lateral cross-section of said entrance profile,
  wherein said die plate defines said first substrate outlet,
  wherein said guide plug includes an outer profile protrusion that extends forward from a front face of said guide plug, and
  wherein said outer profile protrusion of said guide plug is correspondingly-shaped with at least a portion of said die block, so as to form a substantially airtight seal when said guide plug is coupled with said die block.

41. The method of claim 40, wherein said first elongated substrate has a lateral cross-section substantially corresponding in shape to lateral cross-sections of said inner profile of said substrate inlet and said substrate outlet.

42. The method of claim 41, wherein said lateral cross-section of said first elongated substrate has an average clearance through said substrate outlet of at least 1 mil.

43. The method of claim 40, wherein said inner profile of said substrate inlet has a non-circular lateral cross-section, wherein said substrate outlet has a non-circular lateral cross-section.

44. The method of claim 40, wherein the pressure in said die during said contacting of step (c) is in the range of from about 25 psi to about 2,000 psi, wherein the temperature in said die during said contacting of step (c) is in the range of from about 100° F. to about 1,000° F.

45. The method of claim 40, wherein said first elongated substrate is passed through said coating cavity at a line speed of at least 10 feet/minute.

46. The method of claim 40, wherein said coating material has an average residence time in said coating cavity of less than 60 seconds.

47. The method of claim 40, wherein said coated first substrate has an average coating thickness of less than 40 mils.

48. The method of claim 40, wherein said first elongated substrate comprises wood, plastic, metal, or mixtures thereof.

49. The method of claim 40, wherein said coating material comprises a thermoplastic polymer.

50. The method of claim 40, further comprising pushing a second elongated substrate into said die behind said first elongated substrate in a butt-to-butt manner such that the back end of said first elongated substrate and the front end of said second elongated substrate contact one another.

51. The method of claim 40, wherein said introducing of step (a) includes introducing said pressurized coating material into a coating channel defined in said die block, wherein said pressurized coating flows from said coating channel and into said coating cavity as said first elongated substrate is passed through said coating cavity during at least a portion of step (c).

52. The method of claim 40, said die plate defines at least one feathering channel adjacent the intersection of two sides of said substrate outlet.

53. The method of claim 40, further comprising, subsequent to said discharging of step (d), removing said guide plug and said die plate from said die block; coupling another guide plug and another die plate to said die block in place of the removed guide plug and die plate, wherein said another guide plug defines a second substrate inlet and said another die plate defines a second substrate outlet; introducing pressurized coating material into said coating cavity of said die; passing a second elongated substrate through said coating cavity to contact said second elongated substrate with said coating material; and discharging said second elongated substrate from said die through said second substrate outlet, wherein said first elongated substrate and said second elongated substrate have lateral cross-sections of different shapes and/or sizes.

54. The method of claim 40, wherein at least a portion of said coating cavity has a lateral cross-sectional area that is larger than the lateral cross-sectional area of said inner profile of said substrate inlet and is larger than the lateral cross-sectional area of said substrate outlet.

55. The method of claim 40, wherein said die block comprises a die body void extending through at least a portion of said die block to at least partially define said coating cavity, wherein said die body void is defined by two opposing side surfaces, an upper surface, and a lower surface, wherein said side surfaces are substantially coplanar along the direction of intended substrate passage through said die, wherein said upper surface is substantially coplanar with said lower surface along the direction of intended substrate passage through said die.

* * * * *